US009402188B2

(12) United States Patent
Sofman et al.

(10) Patent No.: US 9,402,188 B2
(45) Date of Patent: Jul. 26, 2016

(54) GEO-LOCATION ERROR CORRECTION FOR SMALL CELL PLACEMENT

(71) Applicants: Alcatel-Lucent USA Inc., Murray Hill, NJ (US); Alcatel-Lucent, Boulogne Billancourt (FR)

(72) Inventors: Lev B. Sofman, Allen, TX (US); Harold J. Batteram, Kortenhoef (NL); Christopher J. Davolos, Warrenville, IL (US); Ronald L. Kaufman, Westfield, NJ (US); Thomas B. Morawski, Westfield, NJ (US); Amit K. Mukhopadhyay, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/120,316

(22) Filed: May 14, 2014

(65) Prior Publication Data

US 2015/0334576 A1 Nov. 19, 2015

(51) Int. Cl.
H04W 24/00 (2009.01)
H04W 16/18 (2009.01)
H04W 4/02 (2009.01)
H04W 84/04 (2009.01)

(52) U.S. Cl.
CPC .............. *H04W 16/18* (2013.01); *H04W 4/021* (2013.01); *H04W 4/025* (2013.01); *H04W 84/045* (2013.01)

(58) Field of Classification Search
CPC ..... H04W 16/18; H04W 16/20; H04W 4/021; H04W 4/025; H04W 84/045
USPC .............. 455/456.1–456.6, 422.1, 414.2, 446
See application file for complete search history.

(56) References Cited

U.S. PATENT DOCUMENTS 7,113,782 B2 * 9/2006 Lucidarme ................. 455/432.1
2013/0336138 A1 * 12/2013 Venkatraman et al. ....... 370/252

* cited by examiner

*Primary Examiner* — Wayne Cai
(74) *Attorney, Agent, or Firm* — McCormick, Paulding & Huber, LLP

(57) ABSTRACT

To effectively plan small cell placement within a current macro cell network, it is necessary to identify the traffic hotspots. Small cells can be placed in hotspot locations in order to effectively offload traffic from the corresponding macro cell. Hotspots can be identified based on information about traffic from/to mobile users, particularly, the observed User Equipment (UE) locations and amount of data transmitted from/to the UEs. Provided are systems and methods for accounting for geo-location errors in identifying hotspots and determining small cell placement.

20 Claims, 33 Drawing Sheets

| Hotspot ID | Macro Cell ID | Sector ID | Metro Cell Type | Rank | Distance to Macro (m) | Radius (m) | Cluster Offload % | Macro Offload % | Local Macro Traffic % | Sessions | Simultaneous Users in BH | Unique Users | Downlink | Uplink | WiFi Downlink | WiFi Uplink | CSVoice + Downlink | Lattitude | Longitude | X | Y |
|---|---|---|---|---|---|---|---|---|---|---|---|---|---|---|---|---|---|---|---|---|---|
| 1 | NYNYU335 | | WCDMA MCO 1W | 1 | 109 | 60 | 25.09% | 25.09% | 100% | 13938 | 52.34 | 42 | 399228.83 | 1312599.67 | | | 399,228.83 | 40.71120 | -74.01045 | -41 | -101 |
| 2 | NYNYU335 | | WCDMA MCO 1W | 2 | 15 | 60 | 3.72% | 3.72% | 100% | 2249 | 12.37 | 21 | 59225.56 | 242616.42 | | | 59,225.56 | 40.71217 | -74.00982 | 13 | 7 |
| 3 | NYNYU335 | | WCDMA MCO 1W | 3 | 174 | 60 | 3.56% | 3.56% | 100% | 2003 | 10.37 | 16 | 56617.71 | 251862.05 | | | 56,617.71 | 40.71145 | -74.01184 | -158 | -73 |
| 4 | NYNYU335 | | WCDMA MCO 1W | 4 | 167 | 60 | 0.40% | 0.40% | 100% | 246 | 3.09 | 5 | 6295.00 | 9600.48 | | | 6,295.00 | 40.71073 | -74.00916 | 67 | -153 |
| 5 | NYNYU335 | | WCDMA MCO 1W | 5 | 112 | 60 | 0.22% | 0.22% | 100% | 121 | 1.89 | 3 | 3523.47 | 7505.39 | | | 3,523.47 | 40.71253 | -74.01117 | -101 | 47 |

FIG. 11

| Small Cell Radius | | 20m | 30m | 40m | 50m | 60m | 70m | 80m | 90m | 100m |
|---|---|---|---|---|---|---|---|---|---|---|
| Coordinates of Perturbed Hotspots Cloud's Centroid: | | | | | | | | | | |
| | x (m) | -24.29 | -30.73 | -41.43 | -47.92 | -53.27 | -61.25 | -72.88 | -82.91 | -87.67 |
| | y (m) | -68.25 | -72.12 | -75.49 | -77.72 | -82.29 | -85.49 | -93.54 | -104.32 | -110.21 |
| Standard Deviation | | 6.13 | 5.25 | 4.76 | 5.40 | 5.62 | 5.51 | 5.19 | 5.72 | 5.58 |
| Radius of the Cluster of Perturbed Hotspots (95% Confidence) | | 11.27 | 9.25 | 8.55 | 8.54 | 9.92 | 10.16 | 9.29 | 9.82 | 10.34 |
| Coordinates of Original Hotspot: | | | | | | | | | | |
| | x (m) | -67.00 | -67.00 | -65.00 | -76.00 | -41.00 | -40.50 | -49.50 | -95.50 | -94.50 |
| | y (m) | -123.50 | -118.50 | -114.50 | -116.50 | -100.50 | -90.00 | -84.00 | -146.50 | -147.00 |
| Distance Between Original Hotspot and Centroid of Perturbed Hotspot (m) | | 69.83 | 58.87 | 45.58 | 47.88 | 21.96 | 21.23 | 25.25 | 44.02 | 37.42 |

FIG. 22

GEO-LOCATION ERROR CORRECTION FOR SMALL CELL PLACEMENT

FIELD

This disclosure generally relates to wireless communications.

BACKGROUND

The wireless communication industry is experiencing unprecedented growth of demand for wireless communication capacity. Traditionally, growing capacity demands have been met by infilling or splitting existing macro cells, but this option is reaching its saturation point. In many dense urban areas, macro cells are very close to one another, making it nearly impossible to add more towers. Further, macro-only networks do not provide ubiquitous coverage, because they are built mainly for outside coverage of urban areas and major highways. The majority of cell phone usage today, however, occurs in indoor locations that can be challenging to cover. Macros are also not cost-efficient for rural locations, leaving these areas largely without coverage.

A new kind of network is required that can cost effectively provide ubiquitous coverage, along with the high-bandwidth capacity to deliver a superior quality of experience ("QoE"). The heterogeneous network ("HetNet"), provides this kind of next-generation network. HetNet combines existing wireless technologies, such as W-CDMA, LTE and Wi-Fi, with flexible radio access options, such as small cells. Small cells are low-power wireless access points with cell radius up to hundreds of meters. To effectively plan a small cell placement within current macro cell network, it is necessary to identify the traffic hotspots. Such mobile traffic hotspots can naturally occur in places where many people tend to crowd together such as bus, train or taxi stations, shopping centers and other public areas. Small cells can be strategically placed in such hotspot locations in order to effectively offload traffic from the corresponding macro cell.

SUMMARY

In one embodiment, a computer-implemented method for macro cell hotspot identification, comprises a processor reading an input data comprising a plurality of User Equipment (UE) session records in an area of interest, each of the plurality of UE session records including UE location information; the processor generating a perturbed data by adjusting the UE location information in each of the plurality of UE session records in the input data based on observed geo-location error data in the area of interest; and the processor identifying a hotspot with a high traffic concentration based on the perturbed data comprising the plurality of UE session records with modified UE location information.

In some embodiments of the above method for macro cell hotspot identification, the observed geo-location error data in the area of interest comprises a list of error vectors.

Some embodiments of any of the above of the above method for macro cell hotspot identification further comprise the processor randomly selecting an error vector from the list of error vectors.

In some embodiments of the above method for macro cell hotspot identification, the processor generates the perturbed data by adjusting the UE location information in each of the plurality of UE session records in the input data with the randomly selected error vector.

Some embodiments of any of the above of the above method for macro cell hotspot identification further comprise the processor newly randomly selecting an error vector from the list of error vectors and generating a new perturbed data by adjusting the UE location information in each of the plurality of UE session records in the input data with the newly randomly selected error vector.

Some embodiments of any of the above of the above method for macro cell hotspot identification further comprise the processor identifying another hotspot with a high traffic concentration based on the new perturbed data comprising the plurality of UE session records with UE location information modified with the newly randomly selected error vector.

In some embodiments of the above method for macro cell hotspot identification, the steps of randomly selecting an error vector, generating a new perturbed data and identifying another hotspot with a high traffic concentration based on the new perturbed data are repeated a plurality of times.

Some embodiments of any of the above of the above method for macro cell hotspot identification further comprise the processor analyzing a cluster of the identified plurality of hotspots with high traffic concentrations and identifying the centroid of the cluster.

In some embodiments of the above method for macro cell hotspot identification, each of the identified plurality of hotspots with high traffic concentrations is the best ranked hotspot for its corresponding perturbed data.

In some embodiments of the above method for macro cell hotspot identification, the processor identifies the hotspot with a high traffic concentration also based on amount of data transmitted to and from the UE locations and/or a size of a radius of a small cell.

In one embodiment, a system for macro cell hotspot identification, comprises a processor configured to read an input data comprising a plurality of User Equipment (UE) session records in an area of interest, each of the plurality of UE session records including UE location information; generate a perturbed data by adjusting the UE location information in each of the plurality of UE session records in the input data based on observed geo-location error data in the area of interest; and identify a hotspot with a high traffic concentration based on the perturbed data comprising the plurality of UE session records with modified UE location information.

In some embodiments of the above system for macro cell hotspot identification, the observed geo-location error data in the area of interest comprises a list of error vectors stored in a storage device in communication with the processor.

In some embodiments of the above system for macro cell hotspot identification, the processor is further configured to randomly select an error vector from the list of error vectors.

In some embodiments of the above system for macro cell hotspot identification, the processor is configured to generate the perturbed data by adjusting the UE location information in each of the plurality of UE session records in the input data with the randomly selected error vector.

In some embodiments of the above system for macro cell hotspot identification, the processor is further configured to newly randomly select an error vector from the list of error vectors and generate a new perturbed data by adjusting the UE location information in each of the plurality of UE session records in the input data with the newly randomly selected error vector.

In some embodiments of the above system for macro cell hotspot identification, the processor is further configured to identify another hotspot with a high traffic concentration based on the new perturbed data comprising the plurality of UE session records with UE location information modified with the newly randomly selected error vector.

In some embodiments of the above system for macro cell hotspot identification, the processor is further configured to reiteratively randomly select an error vector, generate a new perturbed data and identify another hotspot with a high traffic concentration based on the new perturbed data for a plurality of times.

In some embodiments of the above system for macro cell hotspot identification, the processor is further configured to analyze a cluster of the identified plurality of hotspots with high traffic concentrations and identifying the centroid of the cluster.

In some embodiments of the above system for macro cell hotspot identification, each of the identified plurality of hotspots with high traffic concentrations is the best ranked hotspot for its corresponding perturbed data.

In some embodiments of the above system for macro cell hotspot identification, the processor is configured to identify the hotspot with a high traffic concentration also based on amount of data transmitted to and from the UE locations and/or a size of a radius of a small cell.

BRIEF DESCRIPTION OF THE DRAWINGS

The foregoing summary, as well as the following detailed description of the embodiments, is better understood when read in conjunction with the appended drawings. For the purpose of illustration, various embodiments are shown in the drawings, it being understood, however, that the present disclosure is not limited to the specific embodiments disclosed. In the drawings:

FIG. 9($b$) shows a plurality of error vectors that include both systematic and random components;

FIG. 11 shows an exemplary output list of ranked hotspots;

FIG. 22 shows a table presenting a summary of the results of the various geo-location error correction simulation scenarios of FIGS. 12-20;

DETAILED DESCRIPTION

Figure 1:
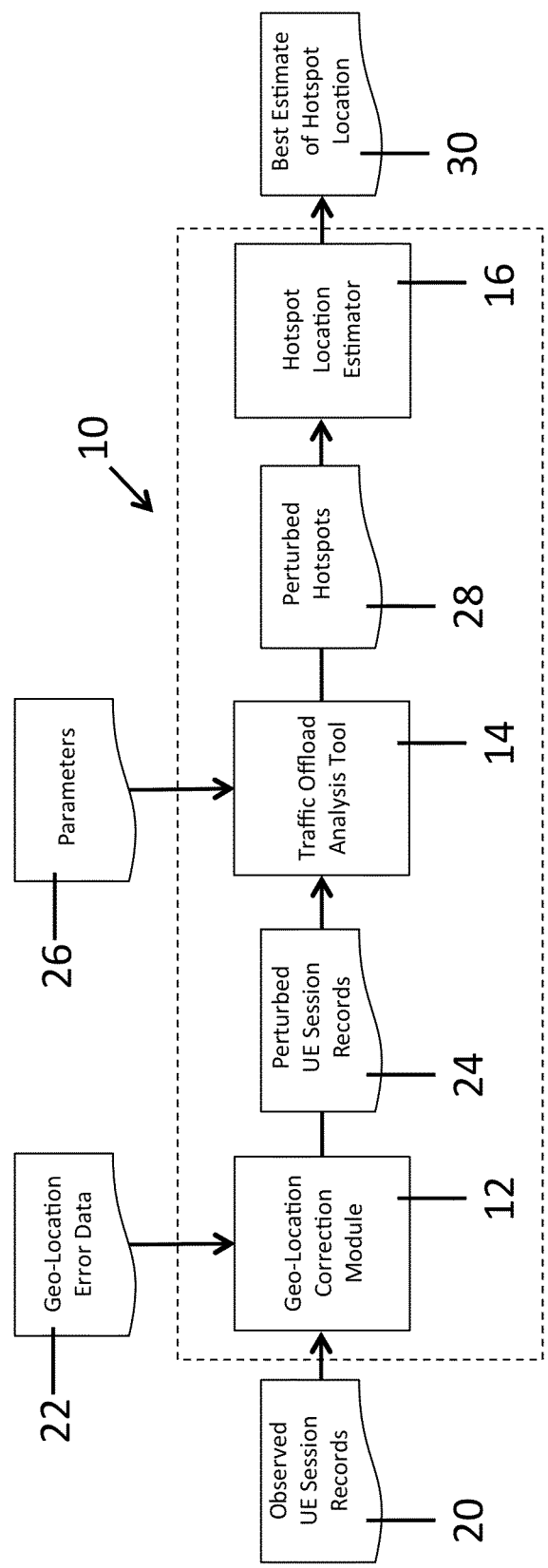
FIG. 1 shows a schematic illustration of an exemplary embodiment of a system for geo-location error correction for small cell placement.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. It is also to be understood that the terminology used is for the purpose of describing particular embodiments only, and is not intended to limit the scope of the claims of the present application. Like numbers refer to like elements throughout the description of the figures.

Also, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. One or more processors may perform the necessary tasks. When implemented in software, firmware, middleware or microcode, the program code or code segments to perform the necessary tasks may be stored in a machine or computer readable medium such as a storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware and existing network elements. Such existing hardware may include one or more Central Processing Units (CPUs), digital signal processors (DSPs), applicationspecific-integrated-circuits, field programmable gate arrays (FPGAs) computers or the like.

Unless specifically stated otherwise, or as is apparent from the discussion, terms such as "processing" or "computing" or "calculating" or "determining" or "displaying" or "reading" or "generating" or "identifying" or "selecting"- or "analyzing" or "retrieving" or "receiving" or "locating" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The present application is related to systems and methods for accurately identifying traffic hotspots in a communication network for effectively placing small cells within a current macro cell network. Small cells can be placed in hotspot locations in order to effectively offload traffic from the corresponding macro cell. Typically, traffic offload tools determine the location of hotspots and the placement of small cells based on information about the location of large concentrations of traffic to/from User Equipment ("UE") in a macro cell ("hotspots"). When there is communication to/from a UE in a macro cell, a UE session record is generated. In particular, a UE session's observed location information (i.e., session's latitude and longitude) is an important input to the traffic offload analyzer for determining the location of hotspots in the macro cell. Unfortunately, the methods available for determining the observed UE location are subject to geo-location error, which can adversely affect the determination of hotspots and small cell placement.

Geo-location error depends on many factors, like location determination method, indoor/outdoor location of the UE, environment (urban, suburban, or rural), weather, presence of tall buildings and/or other obstacles, etc. The methods available for UE location determination can be generally divided into UE based, UE assisted, and Network based methods. In UE based methods, the UE obtains location measurements with assistance from the network and calculates its position. In UE-assisted methods, the UE provides positioning measurements to the network and the network uses the measurements to calculate the UE position. In Network based methods, the network calculates the UE position without UE involvement.

In an Assisted Global Positioning System (A-GPS), GPS enabled UEs use global navigation satellite systems (GNSS) signals to geolocate themselves based on the satellite signals, but the network assists UEs to improve the performance of this geo-location by reducing the GNSS acquisition time, improving receiver sensitivity, and reducing battery consumption. There are two A-GPS methods. In the first, the UE based, or Mobile Station Based (MSB), method, the UE makes the position determination using information (ephemeris, reference location, reference time, etc.) from the A-GPS server. In the second method, the UE-assisted, or Mobile Station Assisted (MSA), method, the mobile service provider (MSP) continuously logs GPS information (mainly the almanac) from the GPS satellites and stores it on the A-GPS server. The A-GPS server uses this data as well as the data received from the UE, calculates the UE's position and sends it back to the UE. Among all network-enabled techniques, A-GPS provides the highest accuracy when UEs have access to GPS signals (5-20 m for outdoor case). It is not reliable indoors or in dense urban/high-rise building environments where signals from multiple satellites are not accessible. In such cases hybrid techniques are employed wherein A-GPS is supplemented with other techniques such as Observed Time Difference of Arrival (OTDOA) or Enhanced Cell ID (ECID).

In a Cell ID method, each Evolved Node B (eNB) in a network broadcasts the Cell-ID to its cells. The UE is always receiving these broadcast messages; thus, it always knows its Cell-ID. It is also available to the eNB if the UE is in an active (RRC connected) state. CID is the least accurate method of all, its accuracy is ~the cell size, i.e., 50-1,000 m. On the other hand, this method is scalable and has high availability. Also, there is an Enhanced Cell ID (ECID) method where the UE position information is localized to a finer level than just the eNB or cell level. It relies on additional radio related measurements such as Timing Advance (TA), which provides a measure of the distance between the eNB and the UE and therefore position the UE to an area bounded by the TA. With further RSRQ/RSRP (receive quality and power) measurements from UE, further positioning of the UE within a sector can be obtained. This method provides an accuracy of ~0.16R, where R is the cell radius.

In an Observed Time Difference of Arrival (OTDOA) method, the UE measures the time difference between Positioning Reference Signals (PRSs) from several (three or more) eNBs and reports these time differences to a specific device in the network. Based on these data, the UE position is calculated using multi-lateration techniques. Accuracy of this method is ~50-300 m. OTDOA is used to supplement A-GPS and is available in dense urban and indoor environments, provided the UE can detect PRS from 3 or more eNBs.

FIG. 1 shows a schematic illustration of an exemplary embodiment of a system 10 for geo-location error correction for identification of traffic hotspots and small cell placement. The system 10 may be a computer system that is programmed to execute one or more programs for geo-location error correction for small cell placement. As shown in the exemplary embodiment of FIG. 1, the system 10 may comprise a geo-location correction module 12, a traffic offload analyzer 14 and a hotspot location estimator 16. The geo-location correction module 12, traffic offload analyzer 14 and hotspot location estimator 16 may be implemented as one or more computer programs implemented on a computer system (e.g., a server or a processing device). The computer programs may be, for example, a series of computer instructions, code segments or program segments stored on a tangible, non-transitory data recording medium ("computer readable medium"), such as a fixed disk. The series of computer instructions, code segments or program segments may constitute all or part of the functionality of the elements described above, and may also be stored in any memory device, volatile or non-volatile, such as semiconductor, magnetic, optical or other memory device.

Figure 2:
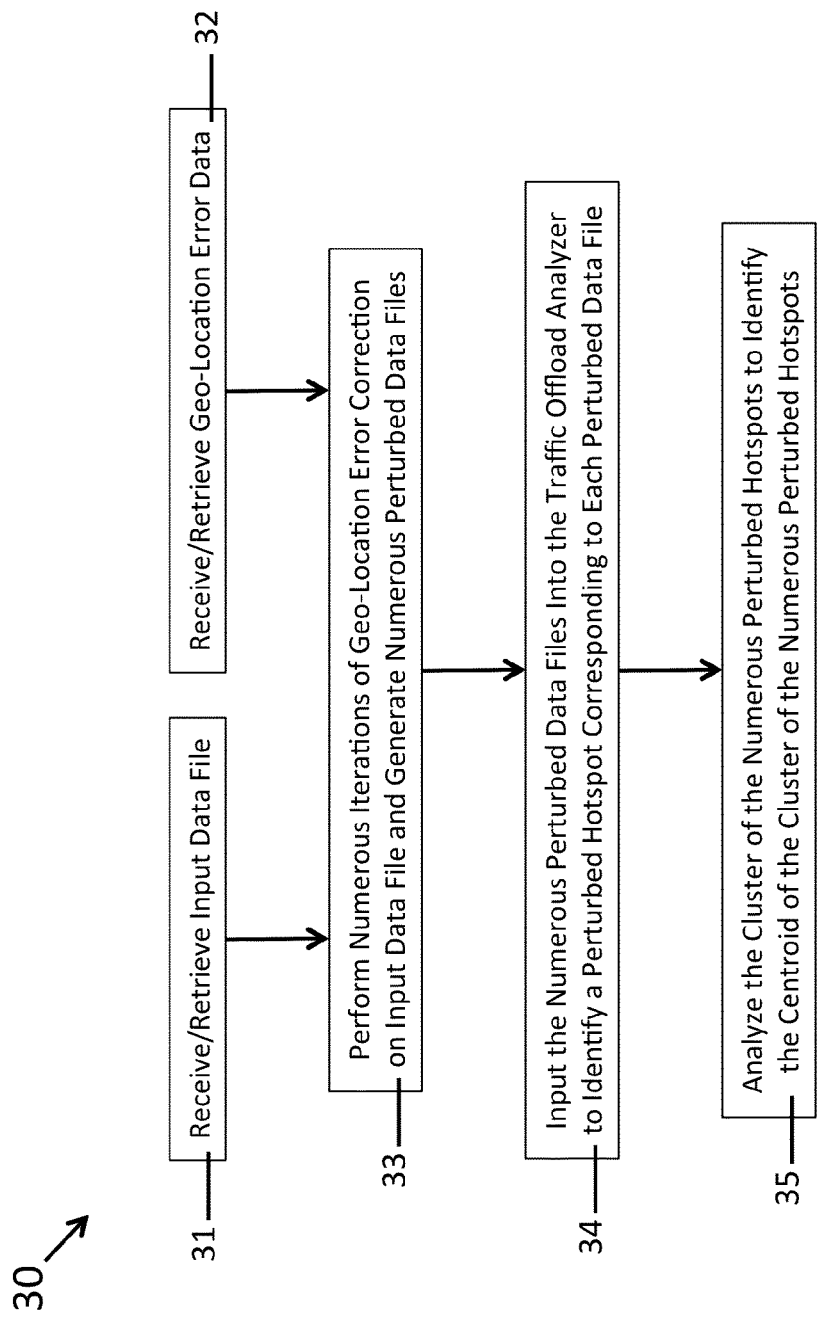
FIG. 2 shows a flow chart of an exemplary embodiment of method for geo-location error correction for small cell placement.

FIG. 2 shows a flowchart of an exemplary methodology 30 implemented by the system 10 for geo-location error correction for identification of traffic hotspots and small cell placement. Referring to FIGS. 1 and 2, in blocks 31, 32, the system 10 receives/retrieves an input data file 20 and geo-location error data 22 corresponding to an area of interest in a macro cell in which traffic is to be offloaded to a small cell. The input data file comprises UE session records in the area of interest in the macro cell. Each UE session record in the input data file 20 includes coordinates (e.g., latitude and longitude) of the observed UE location and amount of data transmitted from/to the UE. The geo-location error data 22 includes statistical characteristics (e.g., distribution) of the geo-location error in the area of interest in the macro cell.

Again, referring to FIGS. 1 and 2, in block 33, the geo-location correction module 12 performs a number of iterations (e.g., 100-1,000 iterations) of geo-location error correction on the input data file 20 and generates a number of perturbed data files 24 (e.g., 100-1,000 files) by perturbing the observed UE location in the UE session records using the statistical characteristics of the geo-location error. In block 34, the traffic offload analyzer 14 analyzes the numerous perturbed data files 24 (e.g., 100-1,000 files) and determines a corresponding set of perturbed hotspot locations. In block 35, the hotspot location estimator 16 then analyzes the cluster of perturbed hotspots and identifies the centroid of the cluster of perturbed hotspots, which can be used as the best estimate of the exact location of a hotspot where a small cell should be placed to offload traffic from the macro cell.

Figure 3:
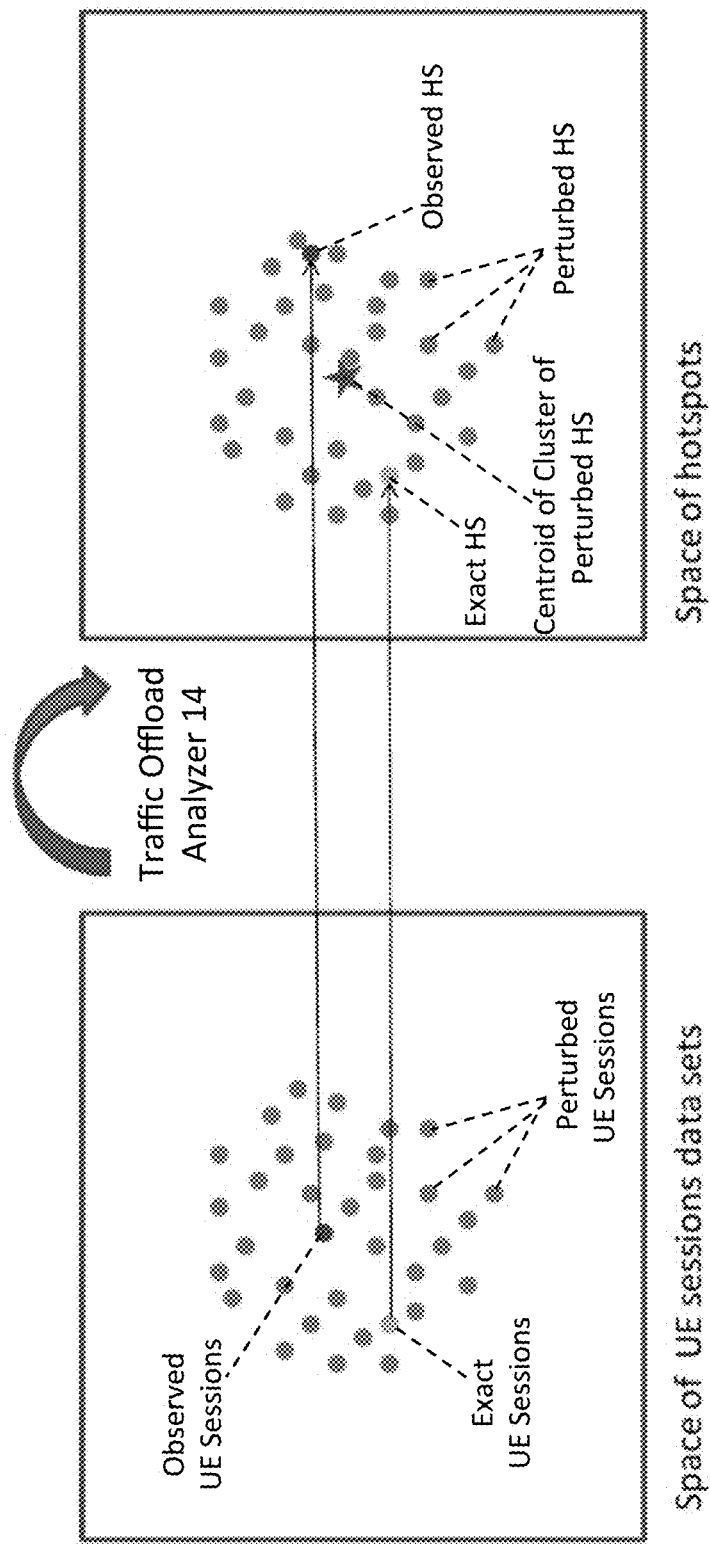
FIG. 3 shows a graphical illustration of exemplary results of an implementation of the methodology of FIG. 2.

FIG. 3 shows a graphical illustration of an implementation of the methodology and system of FIGS. 1 and 2. On the left side of FIG. 3, there is a multi-dimensional space of input data sets. Each dot in this space represents one input data set (file of UE sessions). For example, one dot represents the exact UE session data. Generally, the exact UE locations are not known, but the exact UE locations may be measured with some error. Another dot represents the observed UE session data, which is determined using UE session measurements that include some geo-location error. That is why the observed input data set is different from the exact input data set. In order to estimate corrected UE locations for every UE session in the observed UE session data set, the geo-location correction module 12 performs a number of iterations (e.g., 100-1,000 iterations) of geo-location error correction on the observed UE session data set and generates a number of perturbed input data sets (e.g., 100-1,000 files). Because of the statistical nature of error correction, multiple perturbed input data sets are generated, which form a cloud/cluster of dots in FIG. 3. The perturbed input data sets are estimates of the exact input data, therefore the exact input data is located somewhere inside the cloud/cluster of perturbed input data sets.

On the right side of FIG. 3, there is a space of hotspots of rank 1. Each dot in this space represents a hotspot of rank 1 from the output of the traffic offload analyzer 14. There is a correspondence between dots on the left and on the right sides of FIG. 3. The hotspots of rank 1 on the right side of FIG. 3 are a result of the traffic offload analyzer 14 processing input data sets on the left side of FIG. 3. Hotspots that correspond to perturbed input sets ("perturbed hotspots") form a cloud in the right part of FIG. 3. The hotspot that corresponds to the exact input data is located somewhere inside of this cloud. The center (centroid) of this cloud is the best estimate of the unknown location of the exact hotspot; the size of this cloud defines a confidence of this estimate. The traffic offload analyzer 14 maps a space of input data sets into a space of hotspots of rank 1. The mapping is not linear, e.g., an original input data set that is in the center of the cloud of perturbed input data sets will not necessarily be mapped into the centroid of the cloud of perturbed hotspots.

As shown in the exemplary embodiment of FIG. 1, the system 10 takes an input data file 20 comprising a list of UE session records in an area of interest in a macro cell. Each UE session record in the input data file 20 represents information about a single UE session and may include the following fields:
1. Cell Id
2. Sector Id
3. Session latitude
4. Session longitude
5. Downlink traffic
6. Uplink traffic
7. IsVoice, Boolean value to indicate if the session is a voice call
8. User Id
9. RSCP (signal strength in dBm)
10. Session start time
11. Session end time Each UE session record in the input data file 20 includes coordinates (e.g., latitude and longitude) of the observed UE location and amount of data transmitted from/to this UE.

Figure 4:
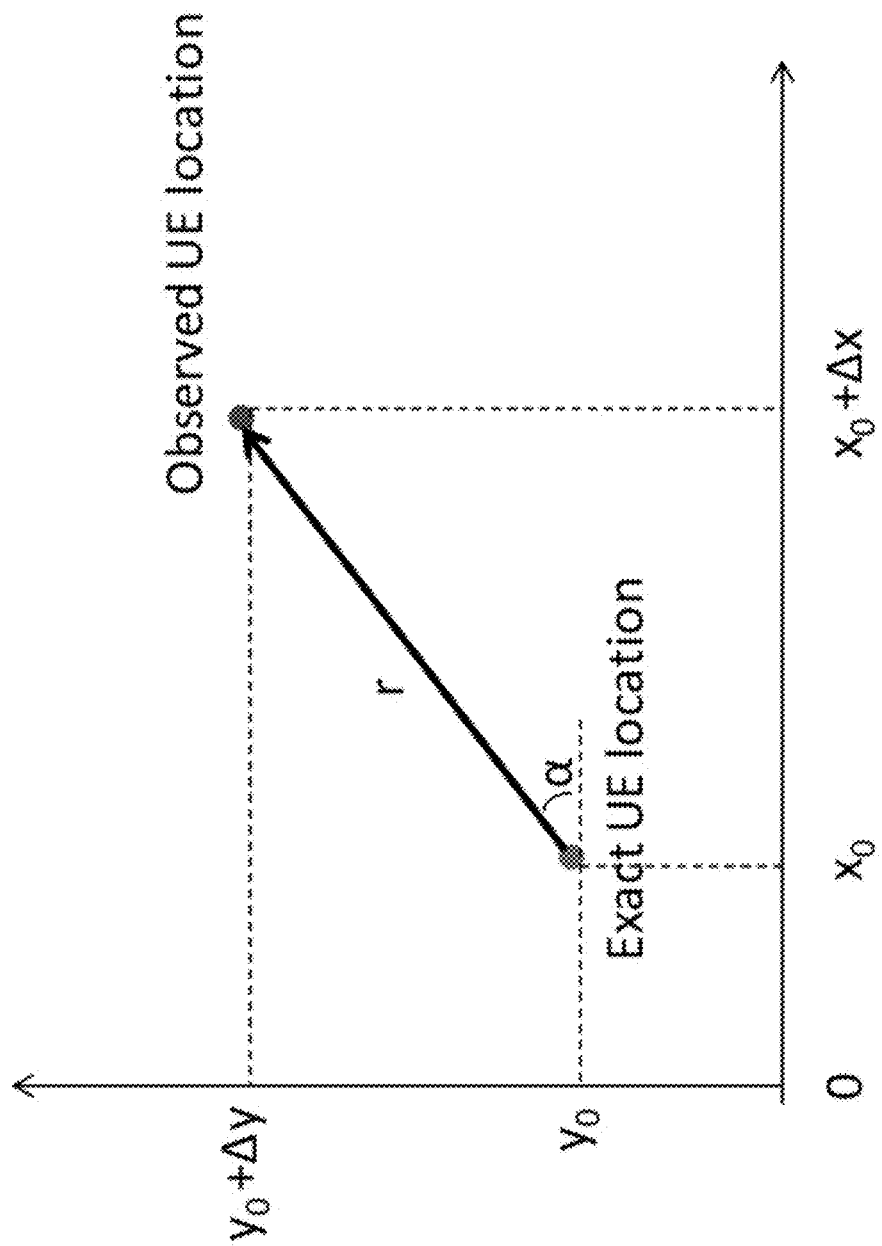
FIG. 4 shows an illustration of a geo-location error vector.

As described above, however, a UE session's observed UE location information (i.e., session's latitude and longitude) may include a geo-location error. The system 10 includes a geo-location correction module 12 configured to account for the geo-location error and correct the location information for every UE session record in the input data file 20. The geo-location error may be represented by Cartesian or polar coordinates. As shown in FIG. 4, a geolocation error may be presented by vector r; where absolute error (i.e., distance between observed (measured) and exact location) is the length of vector r, and angle $\alpha$ is the angle between vector r and the positive direction of the x-axis.

Using notation from FIG. 4, the following can be stated:

Observed UE location=Exact UE location+Geo-location error.

Therefore, $$\text{Exact UE location} = \text{Observed UE location} - \text{Geo-location error.} \quad \text{(Equation 1)}$$

Unlike the observed UE location, the exact UE location is unknown, but Equation 1 gives the best estimate of the exact UE location assuming that statistical characteristics (e.g., distribution) of geo-location error are known.

In order to account for the impact of geo-location error on traffic hotspot determination and small cell placement, it is preferable to know more detailed statistical characteristics, such as two-dimensional distributions of the geo-location error. For example, more detailed statistical characteristics of geo-location error may be determined with field tests of a number of UE sessions from an area of interest in a macro cell. For each UE session, several observed/estimated coordinates of each UE location and one exact coordinate of each UE location may be determined. The observed/estimated UE location determinations may be performed based on one of the available methods for observed UE location determination discussed above. The exact location determination may be performed using e.g., GPS measurements. Below are presented some results of geo-location accuracy field tests. The field tests were done in several major metropolitan areas. UE sessions (e.g., calls) were originated from various locations, or calibration points (e.g., coffee shop, hotel lobby, etc.). Observed/estimated location determination was performed by combination of an ECID and OTDOA based algorithm. The combination of ECID and OTDOA was necessary because the UE did not always see 3 different sectors from different sites, which is required for multi-lateration. Usually, the number of base stations used for UE location measurement is an indicator of the relative measurements' accuracy. The greater the number of base stations used for UE location measurement, the better the accuracy of the UE location measurement.

Figure 5:
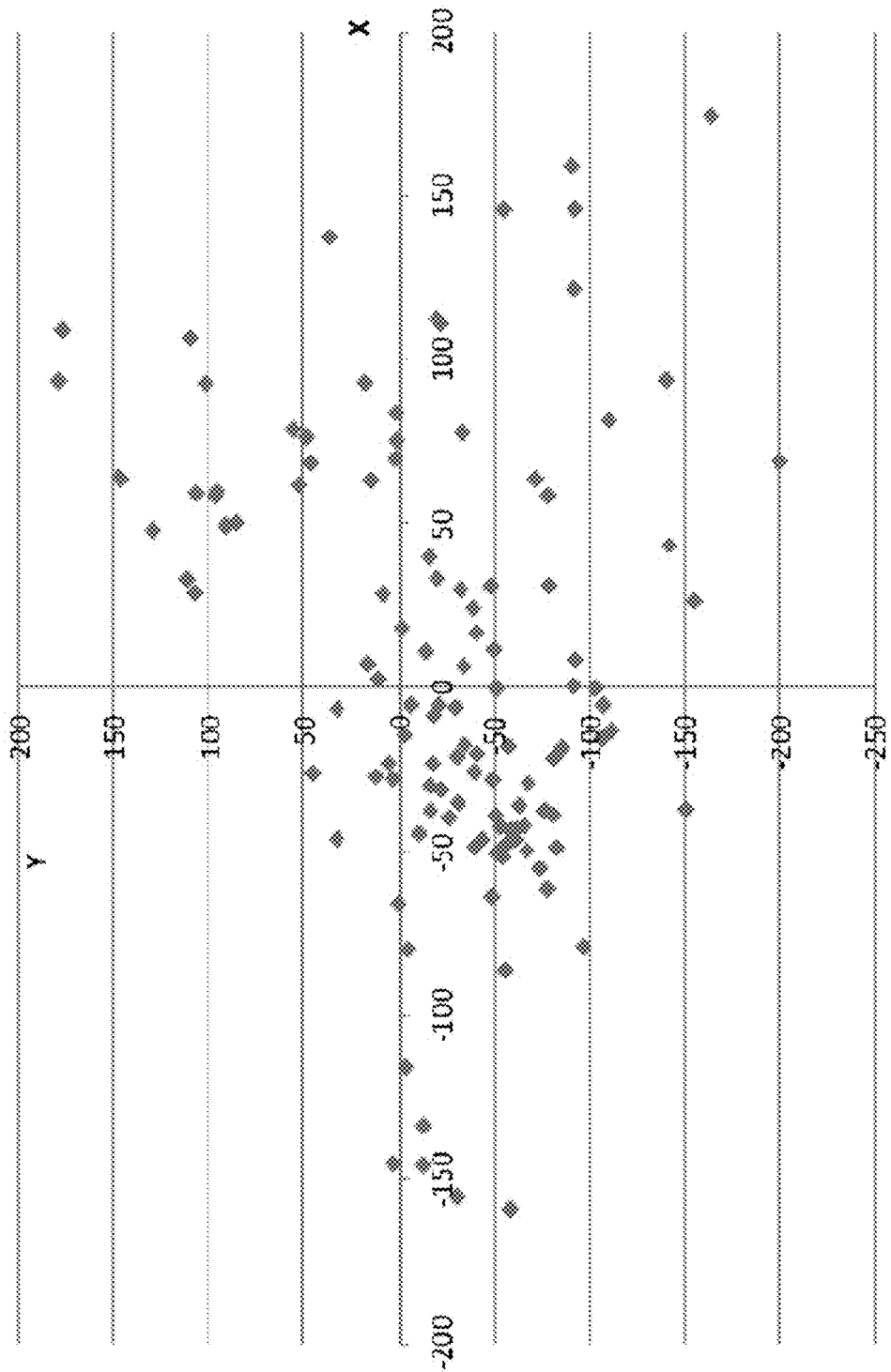
FIGS. 5-7 show the results of field tests for determining geo-location errors.
Figure 6:
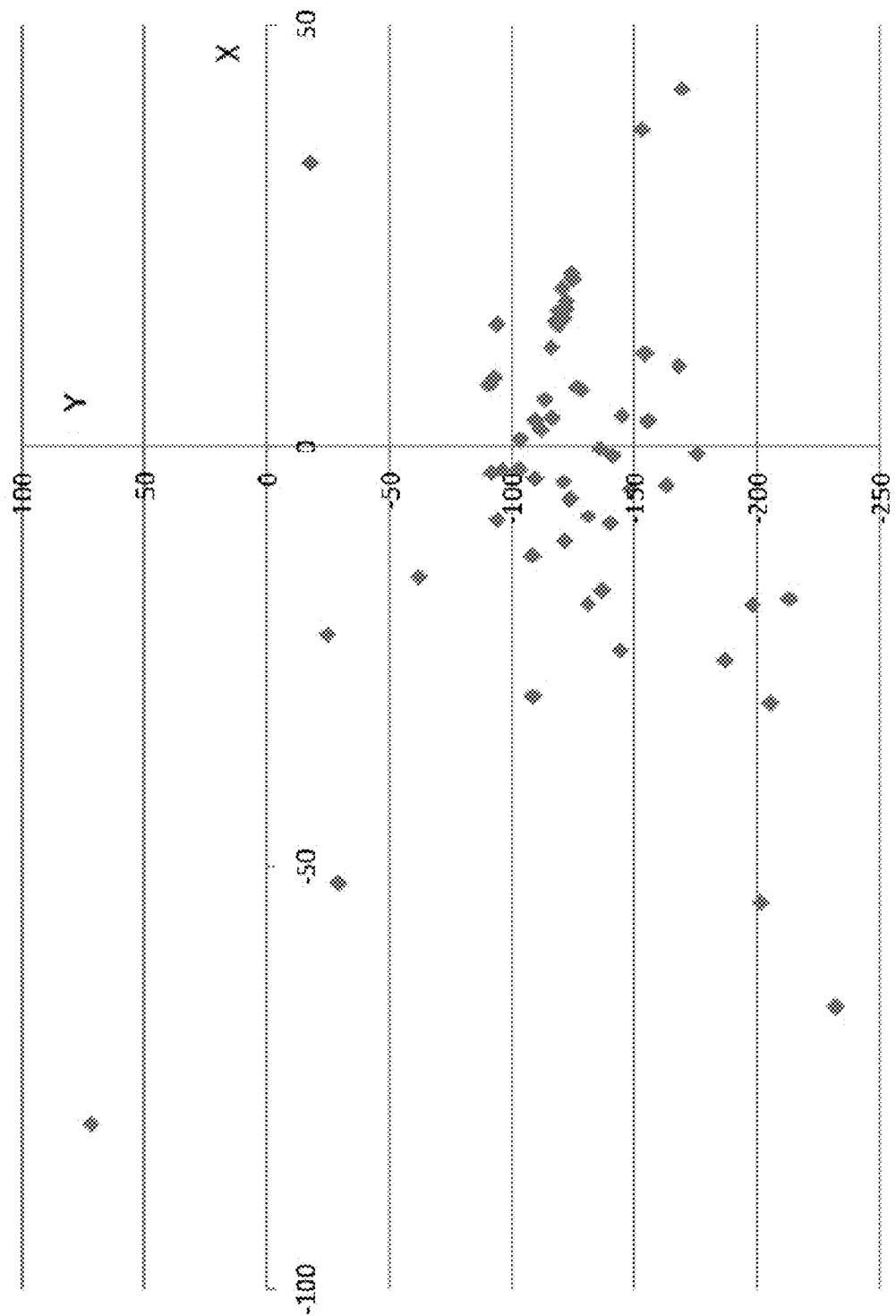
Figure 7:
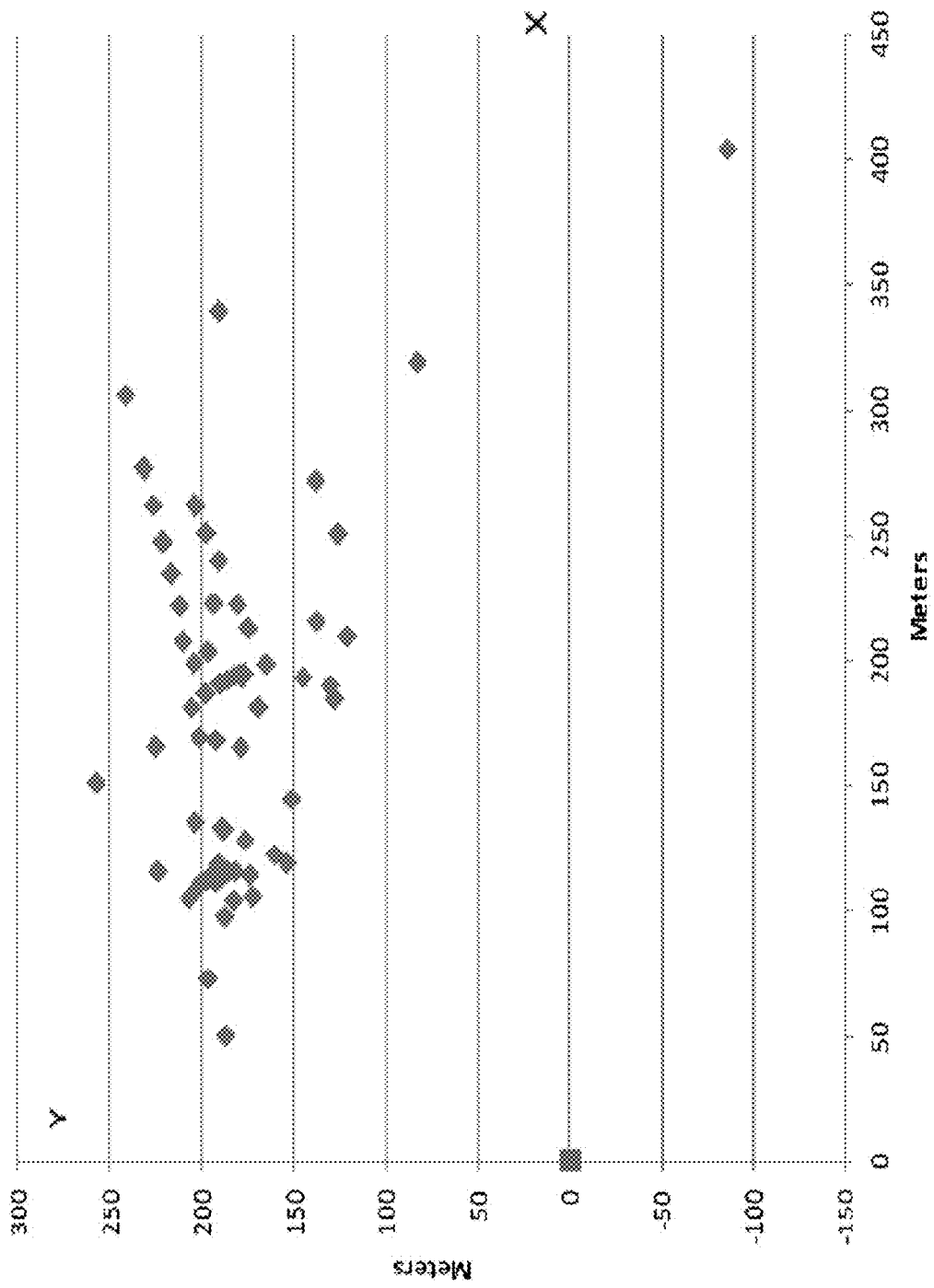
Figure 8:
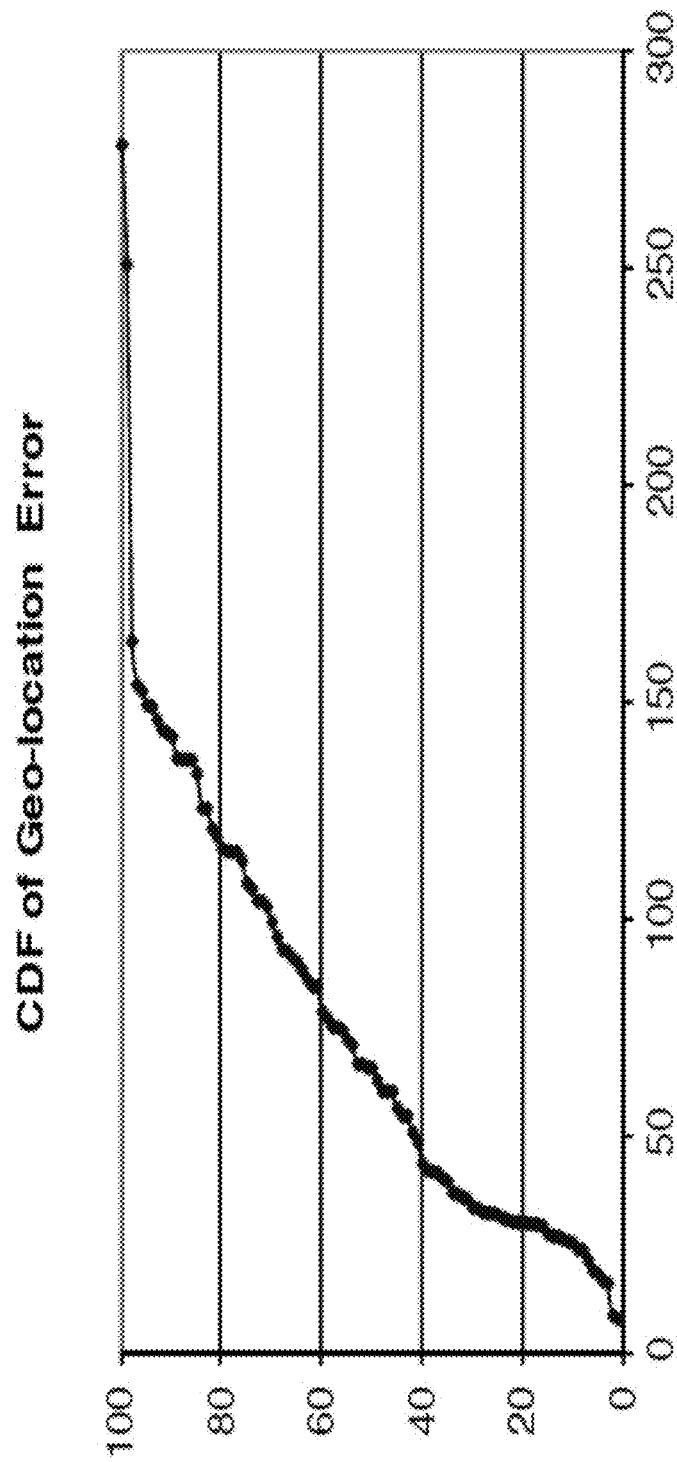
FIG. 8 shows the cumulative distribution function (CDF) of absolute error for the field test of FIG. 5.

The results of field tests in three major metropolitan areas are presented in graphical format in FIGS. 5-7. Each point represents a geo-location error (in Cartesian coordinates) of an observed/estimated UE location determination, where the (0) point is a corresponding exact UE location. The cumulative distribution function (CDF) of absolute error for the field test of FIG. 5 is presented in FIG. 8. The results of the presented field tests demonstrate that: 1) the absolute value of the geo-location error can be up to 200 m and more; 2) the variance of the geo-location error is significant (e.g., hundreds of meters); and 3) as a 2-dimensional random variable, the geo-location error includes both systematic and random components.

The results of the field test of FIG. 7 demonstrate an example of biased geo-location error with a significant systematic component. Almost all measurements of the location of the UE in the field test of FIG. 7 are located northeast of the exact location of the UE. Results of the field test of FIG. 6 also show some systematic component of geo-location error. Almost all measurements of the location of the UE in the field test of FIG. 6 are located south of the exact location of the UE. The random geo-location error component is related to the variance of measurements and is presented in all three field tests.

Figure 9:
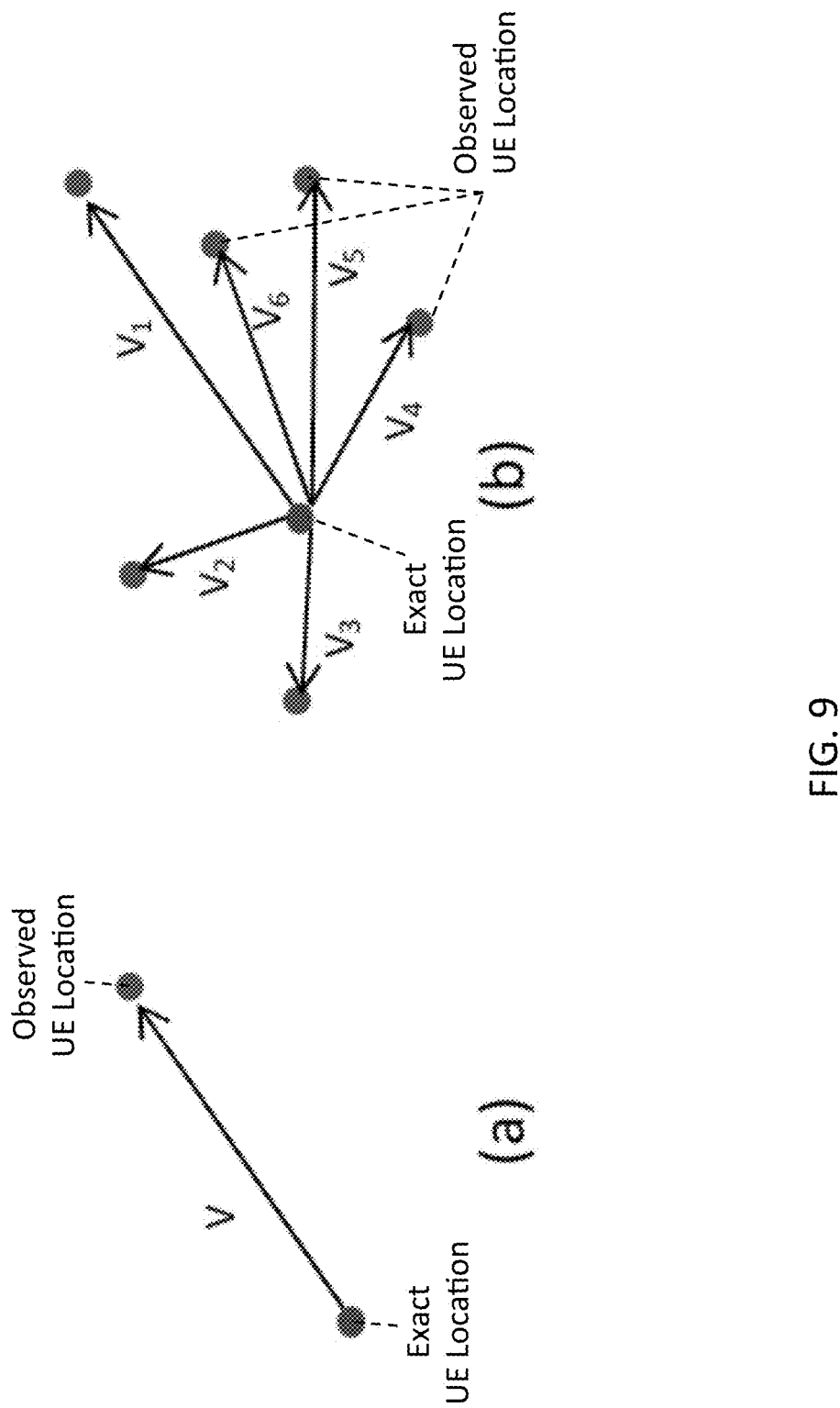
FIG. 9($a$) shows an illustration of a constant error vector having a systematic component only.

When geo-location error includes a systematic component only, then the geolocation error vector V=constant as shown in FIG. 9(a) and Equation 1. Thus, for each UE session record from the input data file 20, the error correction equation is:

Exact UE location=Observed UE location−V    (Equation 2)

As a result, in order to account for the geo-location error, the geo-location correction module 12 may generate a perturbed data file 24, which compensates the observed UE locations in the UE session records of the input data file 20 based on geo-location error data 22.

Figure 10:
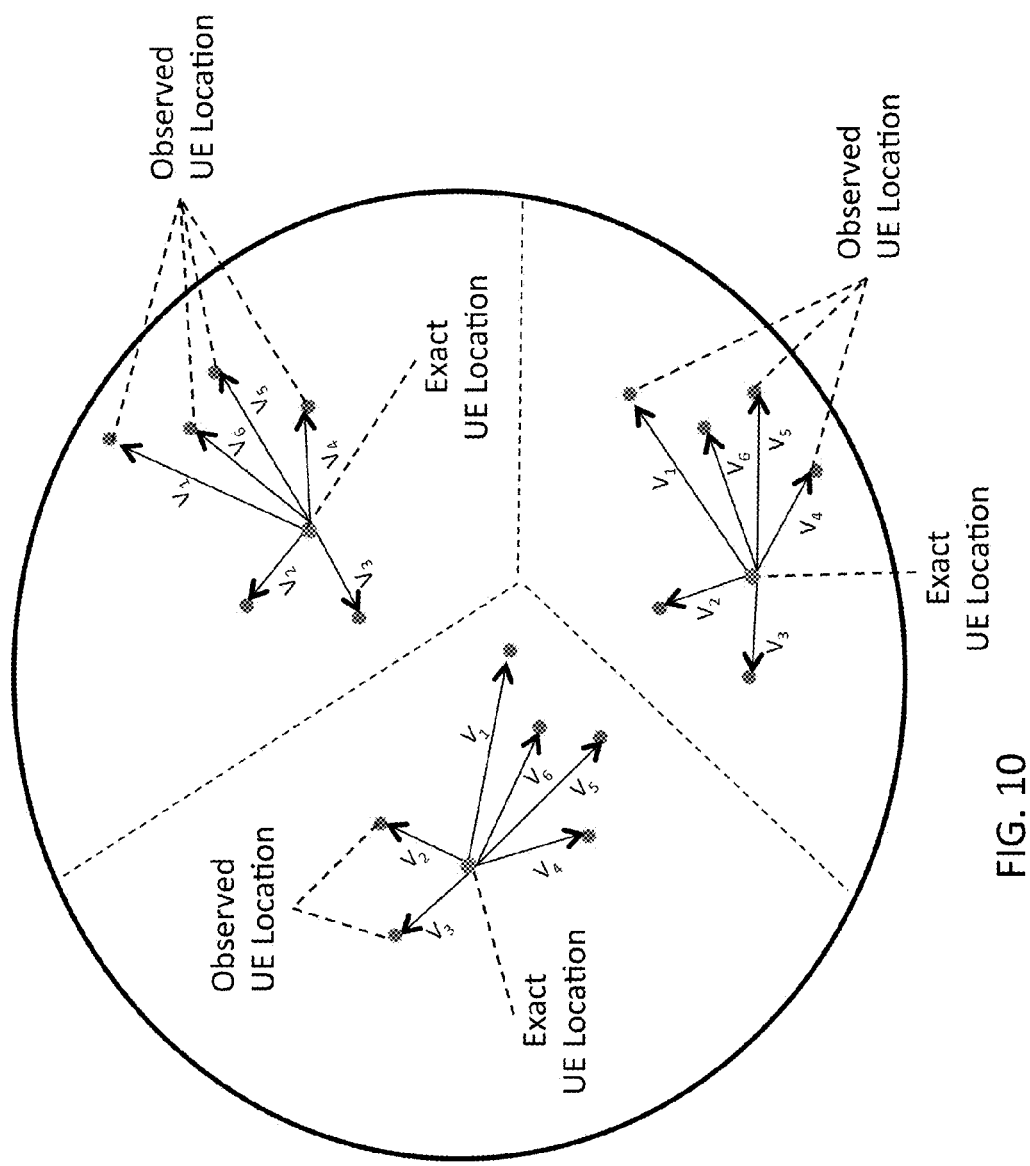
FIG. 10 shows a Voronoi diagram of different regions of a macro cell and their corresponding error vectors.
Figure 12:
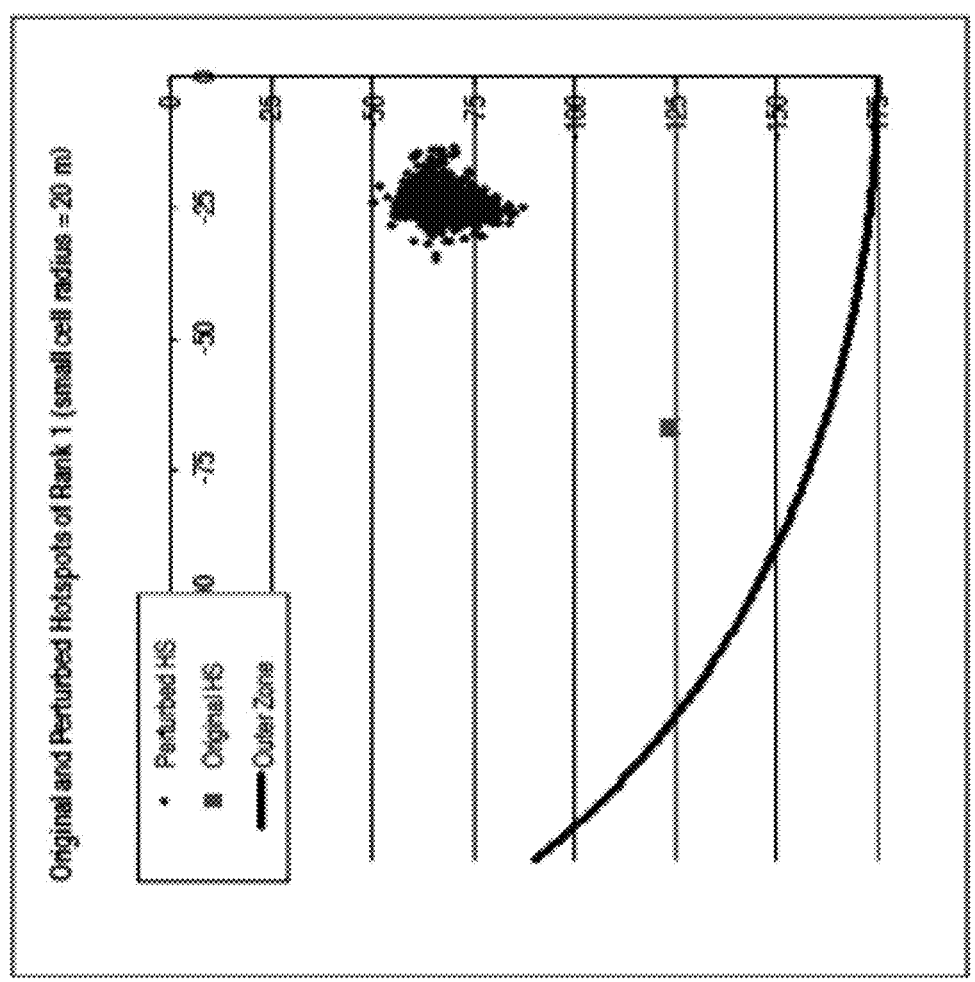
FIGS. 12-20 graphically illustrate the results of various geo-location error correction simulation scenarios with small cell radii of 20 m, 30 m, 40 m, 50 m, 60 m, 70 m, 80 m, 90 m, and 100 m, respectively.
Figure 13:
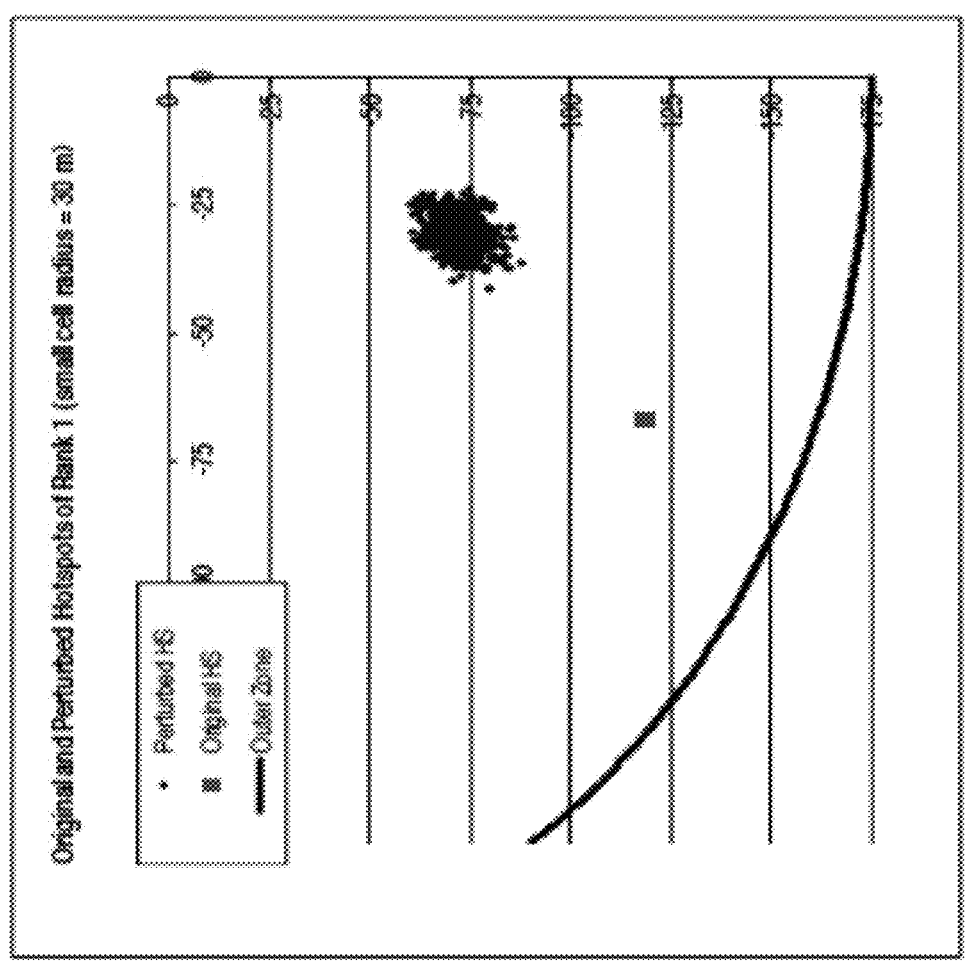
Figure 14:
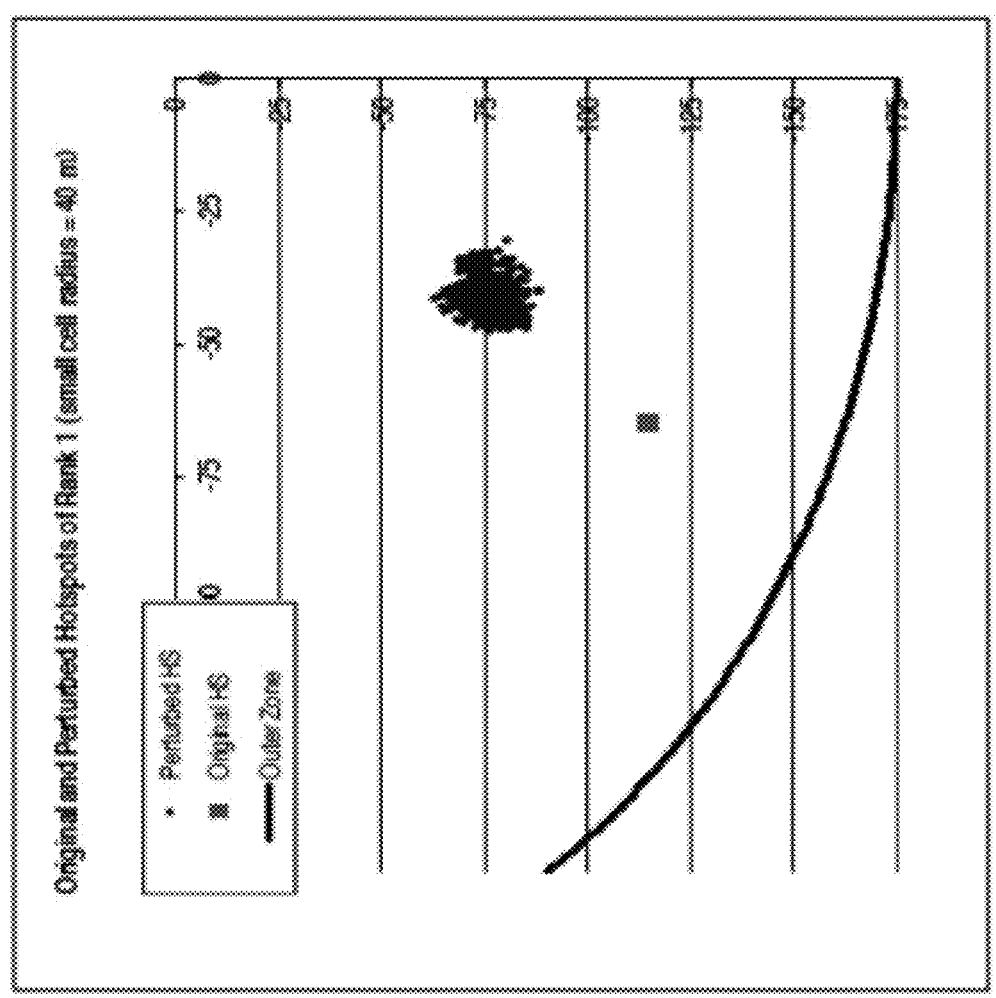
Figure 15:
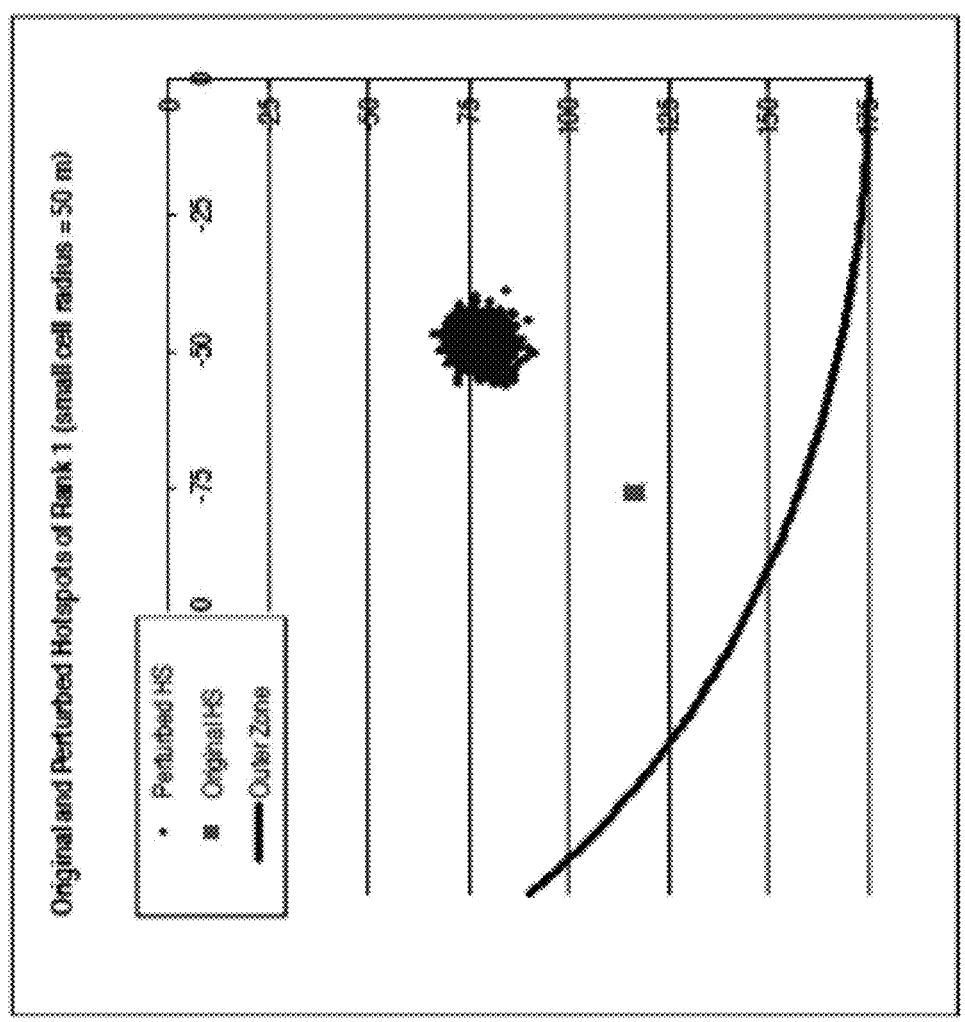
Figure 16:
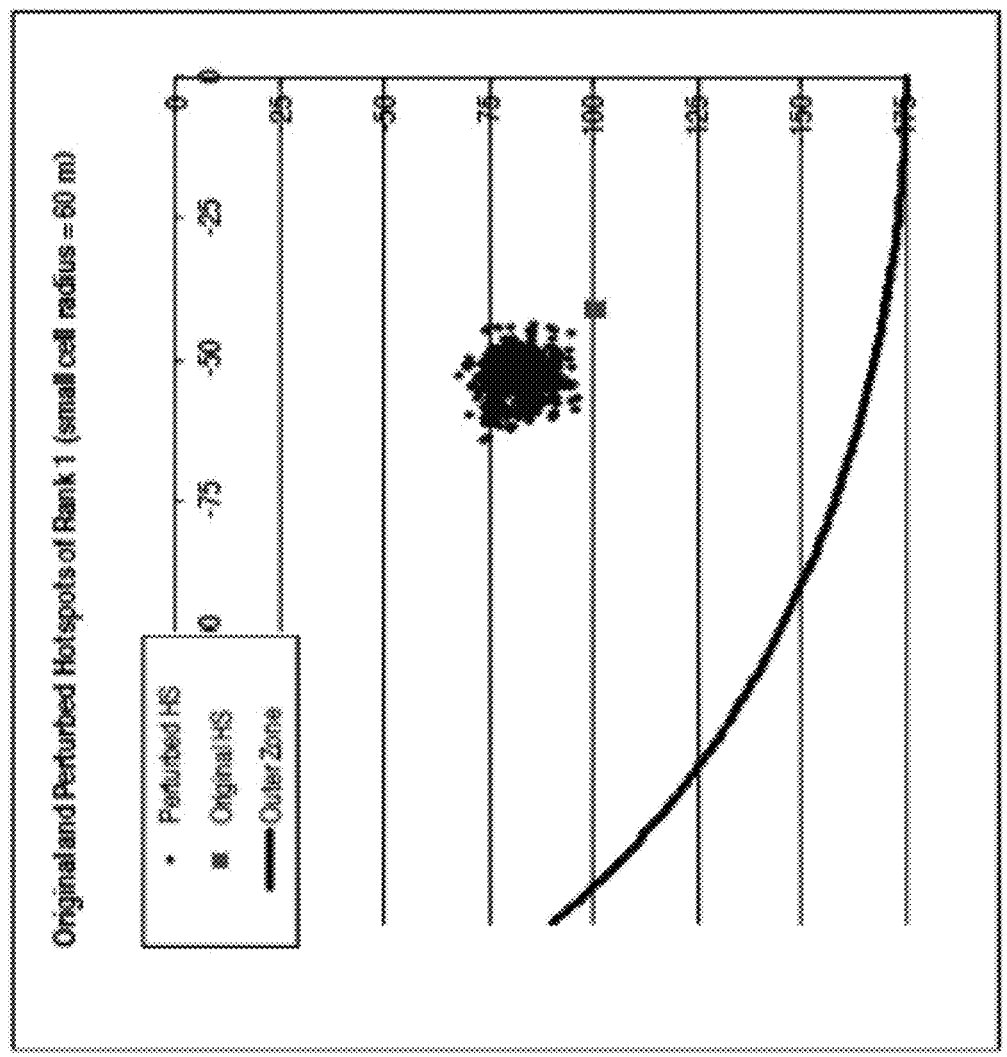
Figure 17:
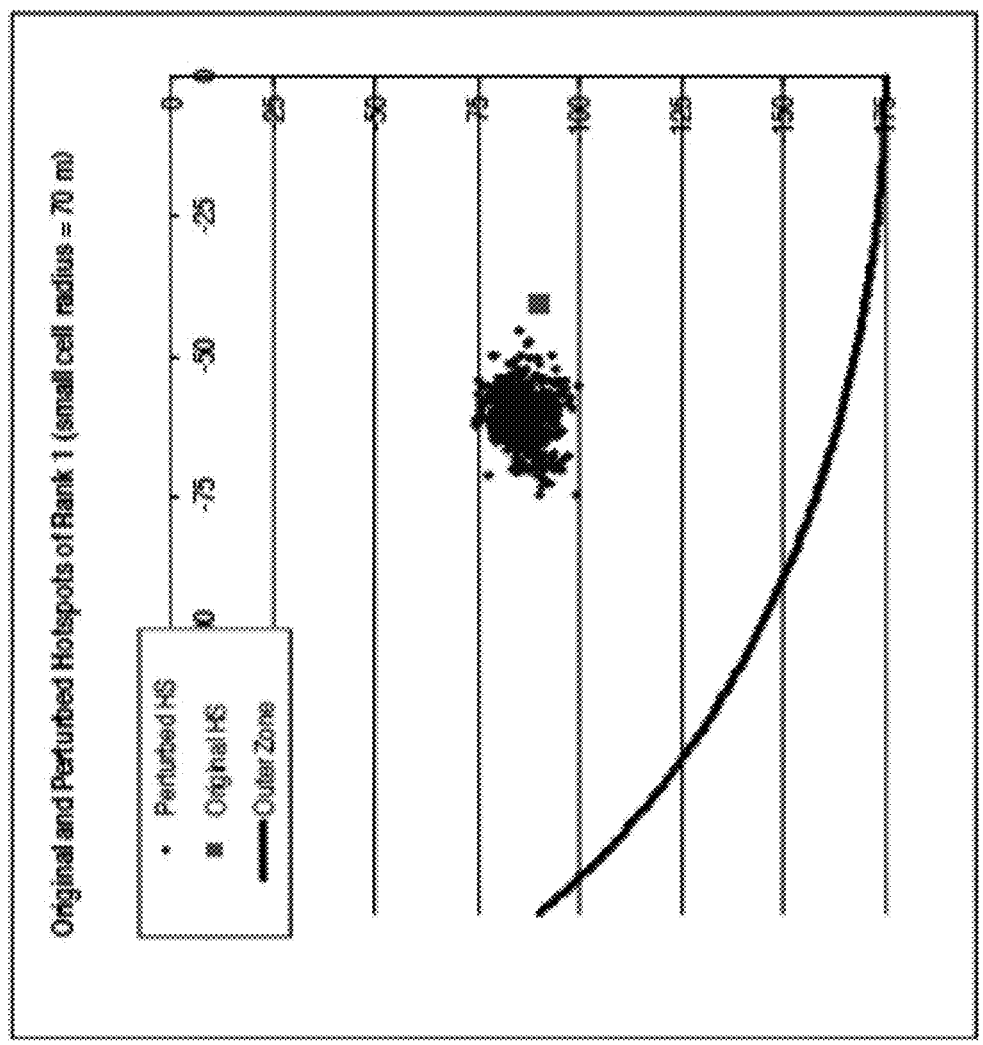
Figure 18:
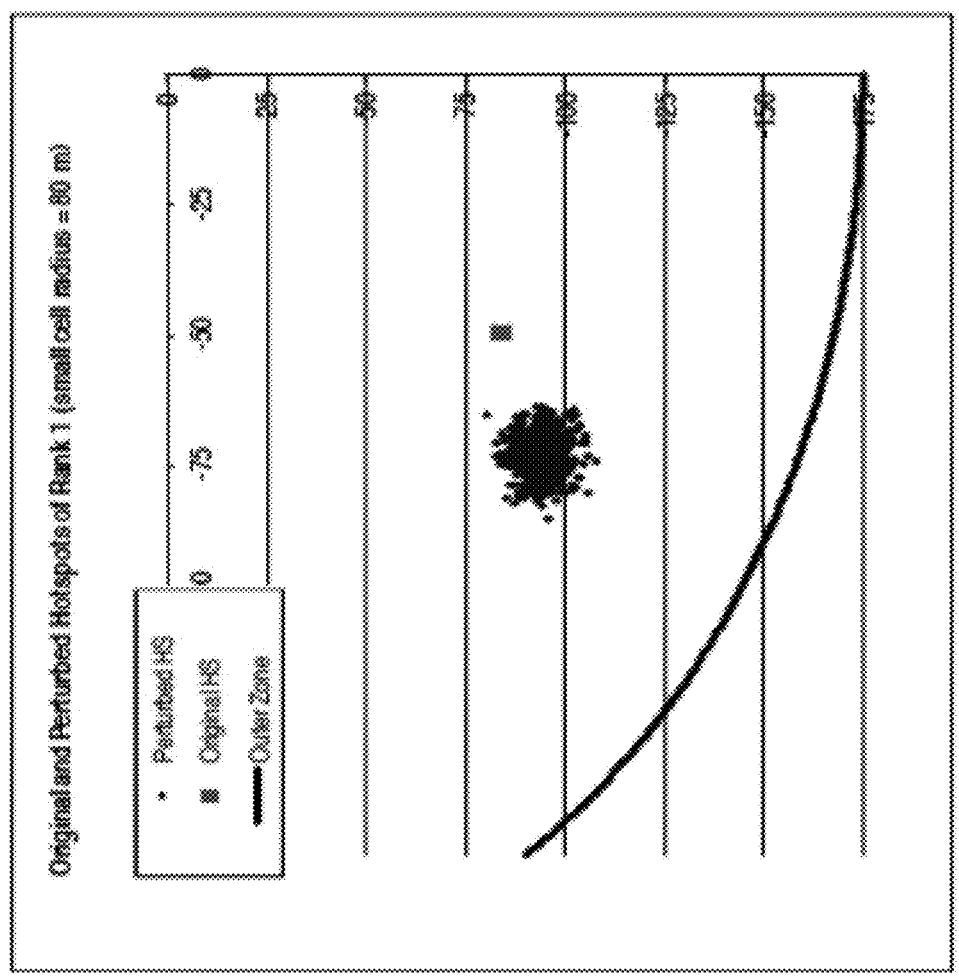
Figure 19:
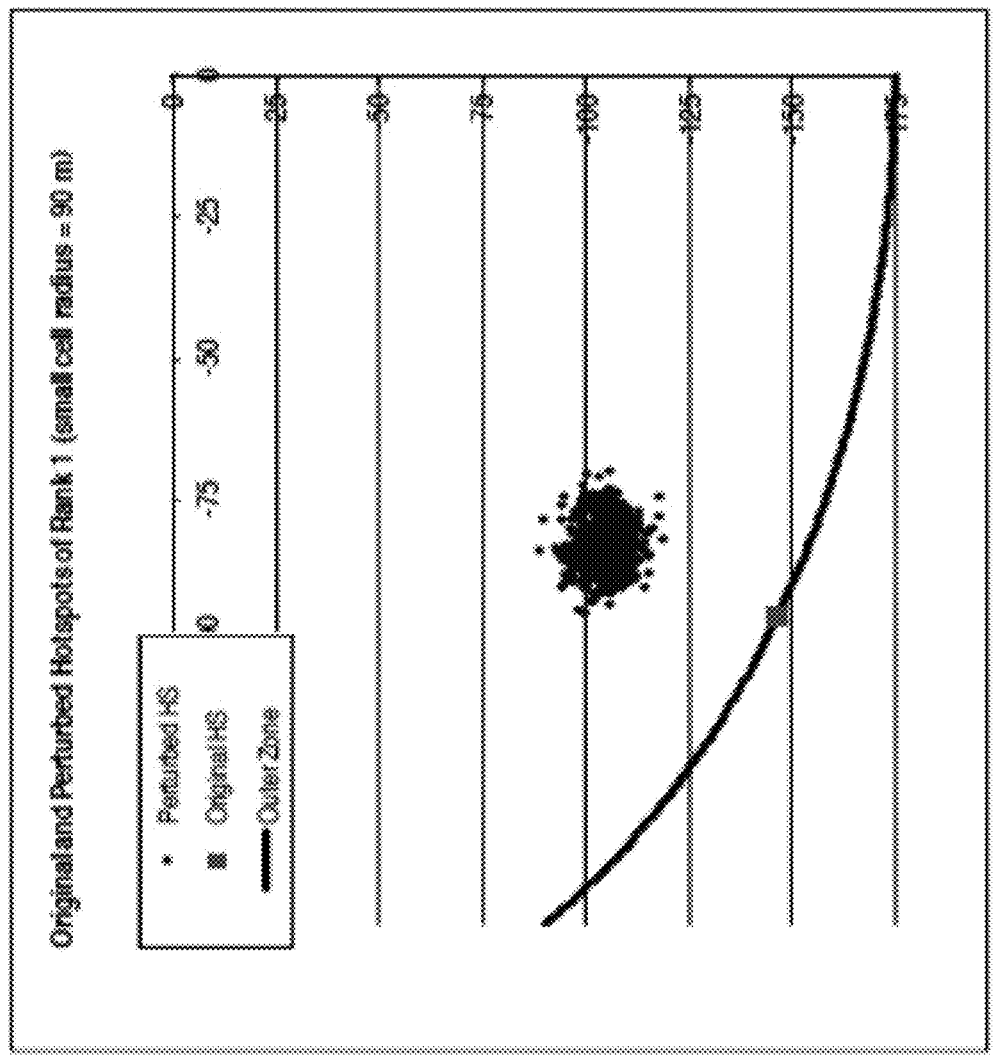
Figure 20:
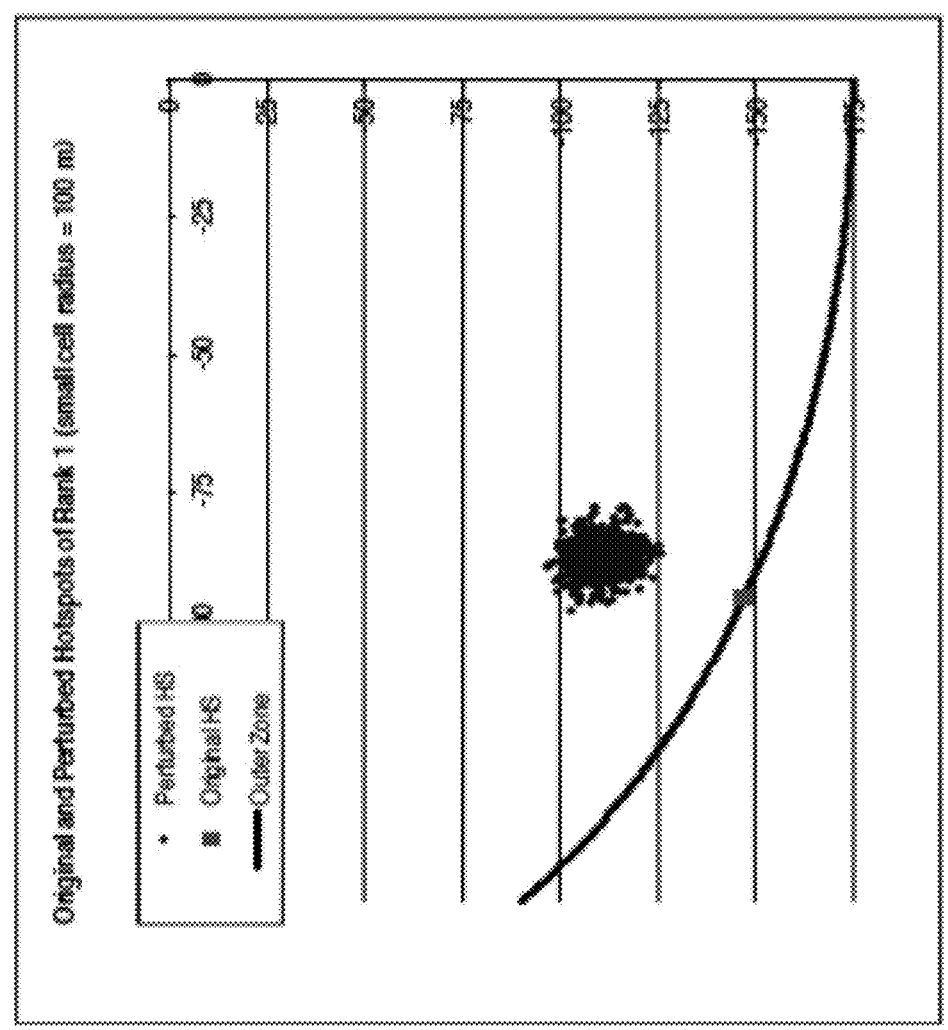

In the general case, however, geo-location error includes both systematic and random components. Instead of a single geo-location error vector V=constant, there is a list of error vectors {Vi} (geo-location error data 22), as shown in FIG. 9(b). This list of error vectors (geo-location error data 22) may be obtained from the geo-location error data from field tests as described above, where several observed/estimated coordinates of each UE location and one exact coordinate of each UE location are determined. As shown in FIG. 9(b), the error vectors Vi (geo-location error data 22) correspond to the observed/estimated UE locations for each exact UE location. Further, if there are several calibration points in a geo-location error correction field test, the macro cell coverage area may be partitioned into several regions (with one calibration point per region). As shown in FIG. 10, each region consists of points that are closer to the calibration point of that region than to any other calibration point in any other region (Voronoi diagram). The geo-location error data 22 from field testing in the area of interest is used to generate a perturbation of the input data file 20.

For each UE session record from input data file 20, one of the error vectors V∈{Vi} (geo-location error data 22) is randomly selected and the UE location for each UE session record is adjusted with the selected vector, as follows:

Corrected UE location=Observed UE location−V    (Equation 3)

The purpose of Equation 3 is to compensate the observed UE locations corresponding to the UE session records in the input data file 20 for geo-location error. In one embodiment, the error vectors V∈{Vi} may be selected randomly with equal probabilities (uniform distribution). In some embodiments of the above method, when information about measurements' accuracy is available, some weight factors may be applied to this statistical distribution. For example, those vectors V that correspond to UE's location measurements with higher accuracy (e.g., their measurements were based on larger number of base stations) will be selected more frequently.

In order to account for the geo-location error in this case, a statistical bootstrapping approach may be employed. The idea behind bootstrapping is to repeatedly resample the observed data, each time producing an empirical distribution function from the re-sampled data. Bootstrapping is useful when estimating distribution of the statistic is complicated or unknown and/or the sample size is too small for regular statistical inference. Accordingly, the process of randomly selecting one of the error vectors V∈{Vi} (geo-location error data 22) and adjusting the UE location for each UE session record in the input data file 20 is reiterated numerous times. Perturbation of all UE locations for all UE session records in the input data file is simulated for each iteration. Thus, for each iteration of the geo-location error correction of the input data file 20, the geo-location correction module 12 randomly selects one of the error vectors V∈{Vi} (geo-location error data 22) and generates a new perturbed data file 24 by subtracting random error from the observed UE location (latitude/longitude) of each UE session record in the input data file 20. To perform the geo-location error correction for observed UE locations, the geo-location correction module 12 performs a large number of iterations (e.g., 100-1000 iterations) for a given input data file 20 to generate a large number of perturbed data files 24 (e.g., 100-1000 files), which are input into the traffic offload analyzer 14.

The traffic offload analyzer 14 determines traffic hotspots based on information about traffic to/from UE. For instance, the traffic offload analyzer 14 may be configured to read the series of perturbed data files 24 generated by the geo-location correction module 12 for a given input data file 20 and to produce a ranked list of perturbed hotspots 28, i.e., recommended locations for small cells. The traffic offload analyzer 14 uses the location information of the UE session records and traffic data to make a determination about optimal placement of small cells. The traffic offload analyzer 14 may be configured to optimize small cell locations to maximize the offloading effect by implementing methodologies such as, for example, those described in: S. Iana and D. Yuan, "*Optimization Approaches for Planning Small Cell Locations in Load-Coupled Heterogeneous LTE Networks*," Proc. 24th International Symposium on Digital Object Identifier (2013), pp. 2904-2908. In one embodiment, the traffic offload analyzer 14 may be Alcatel-Lucent's offload analysis tool, HetNet Ace.

Before execution, the traffic offload analyzer 14 maybe configured by setting macro cell and basic offload parameters 26. Each small cell can serve traffic for those UE sessions that occur within the coverage area, i.e., within some distance (called small cell radius) from that small cell. As a result, traffic load on the macro cell can be reduced (traffic offload). The purpose of traffic offload optimization is to find locations of a given number of small cells that maximize total traffic offload. There are two possible strategies for small cell deployment: shared or dedicated carrier. In the case of shared carrier, small cells are deployed in the same spectrum as the macro cells, therefore, the small cell and macro cell can interfere with each other. In order to minimize the interference, the small cell power levels (and corresponding small cell radius) depend on the distance between the small cell and macro cell. In the case of dedicated carrier deployment strategy, dedicated spectrum is used exclusively for small cells. In this case, a fixed small cell radius can be used for location inside any zone. In both cases, no small cell is placed outside of outer zone of the macro cell. The macro cell outer zone demarcates the maximum effective radius of a macro cell. Outside this zone the probability of the UE establishing an association with the macro cell is low.

In one embodiment, the output of the traffic offload analyzer 14 may be a ranked list of hotspots 28 (i.e., proposed small cell locations) in decreasing order of corresponding traffic offloads, as shown in FIG. 11. As shown in FIG. 11, for each hotspot, the following information may be included:
- Hotspot id
- Macro cell id
- Distance to macro cell [m]
- Small cell radius [m]
- Offload traffic, as % of total traffic
- Download and Upload traffic
- Location of small cell (latitude/longitude and x/y coordinates)

For each random geo-location error correction of a given input data file 20 performed by the geo-location correction module 12, a corresponding new perturbed data file 24 is input to the traffic offload analyzer 14, and a corresponding ranked list of hotspots 28 is generated by the traffic offload analyzer 14. Thus, for a given number of iterations (e.g., 100-1,000) of the geo-location error correction of a given input data file 20 performed by the geo-location correction module 12, a corresponding number of new perturbed data files 24 (e.g., 100-1,000) is input to the traffic offload analyzer 14, and a corresponding number of ranked lists of hotspots 28 (e.g., 100-1,000) is generated by the traffic offload analyzer 14.

The ranked lists of hotspots 28 generated by the traffic offload analyzer 14 are input into the hotspot location estimator 16 for statistical analysis and determination of the best estimate of the hotspot location. Because of the statistical nature of the problem (random geo-location error), the results of error correction may also have a statistical format, i.e., expressed in terms of mean, confidence level, etc., e.g., "with 95% confidence, the exact location of the hotspot is within 10 m from point A (the best estimate)". In a first pass, only the $1^{st}$ ranked hotspot locations (i.e., best possible small cell locations) from each ranked lists of hotspots 28 are considered.

FIGS. 12-20 graphically illustrate the results of various geo-location error correction simulation scenarios with small cell radii of 20 m, 30 m, 40 m, 50 m, 60 m, 70 m, 80 m, 90 m, and 100 m, respectively. Each of FIGS. 12-20 shows the outer zone of the macro cell, an original hotspot determination, and a cluster of perturbed hotspots in Cartesian coordinates with the macro cell at point (0, 0). The boundary of the outer zone is shown as a circle with center at point (0, 0) and radius 175 m. The original hotspot determination is a $1^{st}$ rank hotspot location determined by the traffic offload analyzer 14 based on the original, unmodified input data file 20. The cluster of perturbed hotspots are the $1^{st}$ ranked hotspots (e.g., 1,000 hotspots) from the ranked lists of hotspots 28 (e.g., 1,000 lists) generated by the traffic offload analyzer 14 based on the perturbed data files 24 (e.g., 1,000 iterations).

Figure 21:
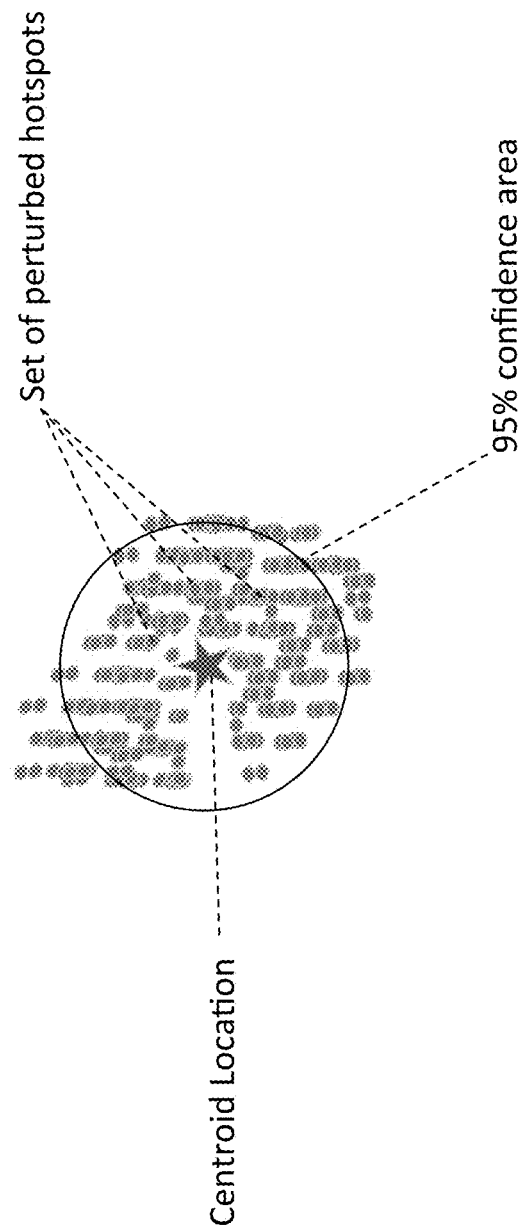
FIG. 21 provides a graphical illustration of a cluster of perturbed hotspots, the centroid of the cluster, and an area of 95% confidence.

The charts of FIGS. 12-20 demonstrate that the perturbed hotspots of rank 1 are clustered in relatively tight formation. As shown in FIG. 21, the centroid of the cluster of perturbed hotspots of rank 1 is the best estimate of the hotspot location after error correction (corrected hotspot location). Also as shown in FIG. 21, the size of the cluster (radius of the circle that covers 95% of all perturbed hotspots) characterizes a level of confidence. The distance between an original hotspot and the cluster indicates an effect of geo-location error on hotspot placement.

In some cases, the original hotspot may be close to the cluster of corresponding perturbed hotspots (e.g., for scenarios with small cell radius=60 m and 70 m), but in the majority of cases, the original hotspot is pretty far away from the cluster of corresponding perturbed hotspots. The table in FIG. 22 presents a summary of the results of the various geo-location error correction simulation scenarios of FIGS. 12-20. The table in FIG. 22 shows the radii of the perturbed hotspot clusters and the distance between the original hotspots and the best estimates of hotspot location (i.e., centroid of perturbed hotspot clusters) for the various small cell radii. For instance, as shown in FIG. 22, when small cell radius=30 m, it is estimated that the corrected hotspot location (best estimate) is the centroid with coordinates (−30.73, −72.12) with 95% confidence that the hotspot is located within 9.25 m from this centroid. Also, as indicated in FIG. 22, the distance between this best estimate and the original hotspot location is ~59 m.

Up to this point, only hotspots of the 1st rank have been considered in illustrating the impact of geo-location error on hotspot determination and small cell placement, because hotspots of the 1st rank are the main contributors to the traffic offload. However, in order to determine the location hotspots of all ranks and the placement of additional small cells, the following iterative approach can be implemented.

In a first pass, only the $1^{st}$ ranked hotspot locations (i.e., best possible small cell locations) from each ranked lists of hotspots 28 are considered. Then, the centroid of the cluster of perturbed hotspots of rank 1 is identified, which indicates the best estimate of the location of a hotspot of rank 1 and the location where a first small cell should be placed. Those UE locations that occur within coverage of this first small cell will be served by this first small cell and the corresponding traffic will be offloaded. In a second pass, all UE locations that are not served by the first small cell are considered and a hotspot of rank 2 is identified using the same methodology used for the hotspot of rank 1. As with the hotspot of rank 1, the geo-location correction module 12 performs a large number of iterations (e.g., 100-1000 iterations) of the geo-location error correction for observed UE locations not served by the corrected hotspot location (best estimate) of rank 1. The same methodology can be repeated to perform the geo-location error correction for observed UE locations not served by the corrected hotspot locations (best estimate) of rank 1 and rank 2, and so on.

Figure 23:
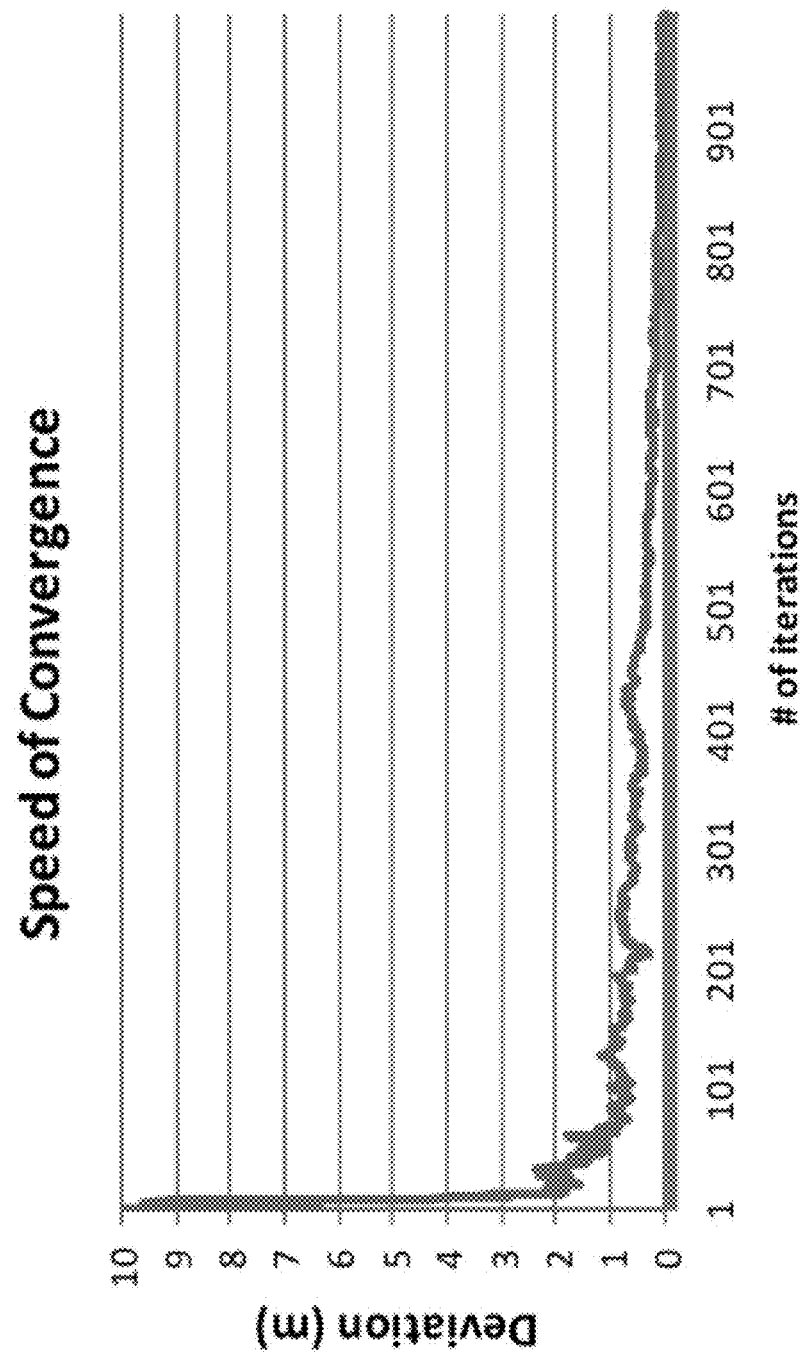
FIG. 23 shows a chart showing the speed of convergence of the centroids' coordinates for the examples of FIGS. 12-20.

In the examples provided herein, 1,000 iterations of the geo-location error correction were used. However, it is possible to use fewer iterations without sacrificing much accuracy in the determination of hotspots and placement of small cells. The number of necessary iterations to achieve accurate results depends on the speed of convergence of the results toward a centroid's coordinates. The value of deviation may be used as a measure of conversion. The deviation is the maximum difference between coordinates of centroid estimated based on a given number of iterations vs. coordinates of centroid estimated based on a maximum number of iterations (i.e., 1,000 iterations). The chart in FIG. 23 shows that the centroid's coordinates for the examples provided herein converged pretty fast and that the number of iterations in the simulation could be reduced without significant sacrifice of accuracy. For example, after ~100 iterations, the deviation is within 1 m.

At least two observations can be made based on the results illustrated in FIGS. 12-20 and 22. First, in spite of the big variance of geo-location error (e.g., hundreds of meters), radii of the clusters of perturbed hotspots are relatively small. This may be explained by the law of large numbers—averaging effect of perturbation of individual observed UE locations. The relatively small size of the clusters represents a good confidence of presented results (~10 m with 95% confidence). Also, "relative" confidence increases with increase in small cell radius. Second, the distance between the original hotspot and the cluster may be significant, which demonstrates that geo-location error has a significant impact on small cell placement.

Figure 24:
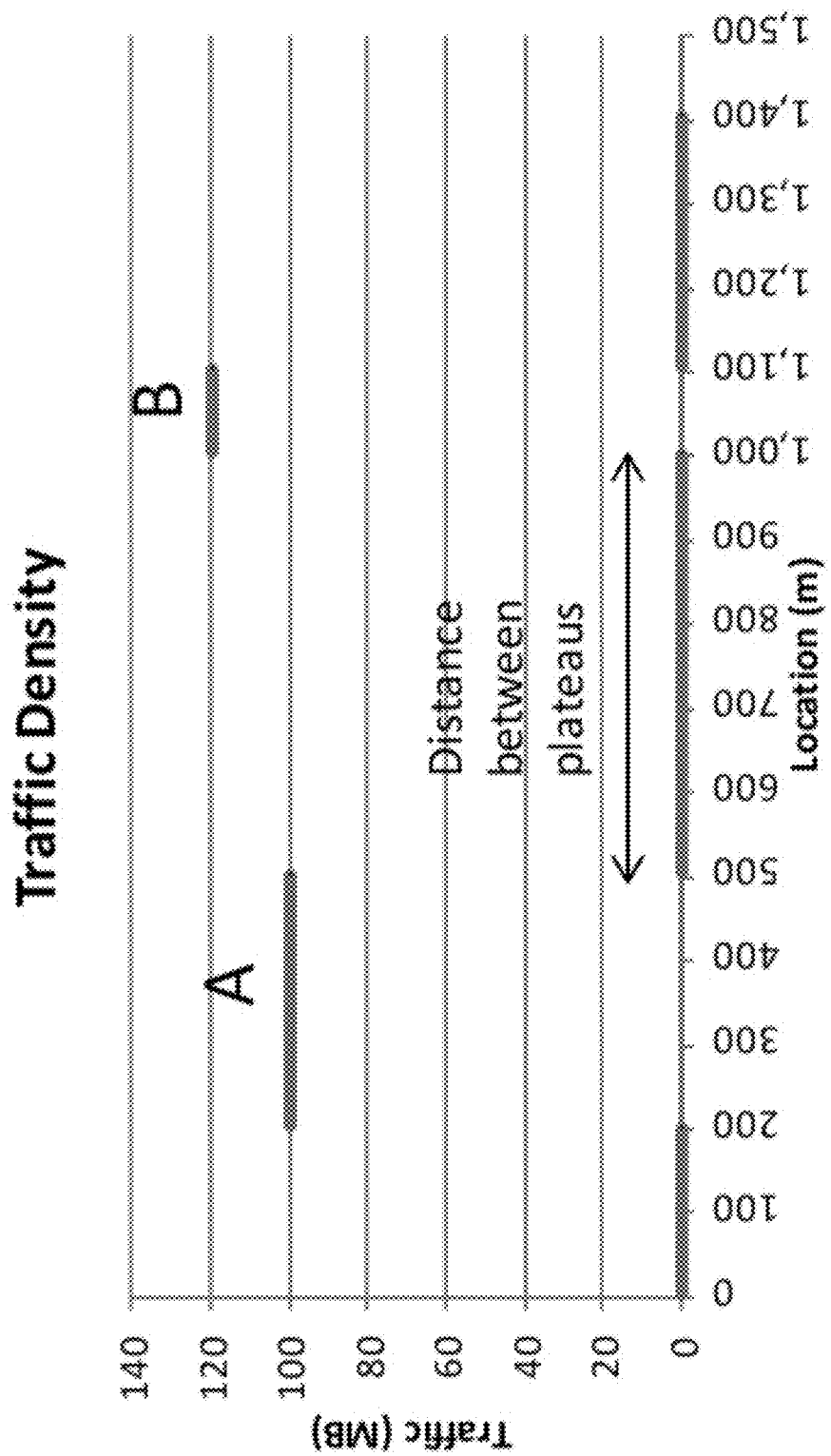
FIG. 24 shows a graph of the traffic density of an exemplary situation.

Why in some cases is the original hotspot far away from the cluster of perturbed hotspots? To answer this question the following one-dimensional example is provided. Some number of UEs is located along the x-line, with one UE per meter for 200 m≤x≤500 m, with each UE downloading 100 MB of traffic, and one UE per meter for 1,000 m≤x≤1,100 m, with each UE downloading 120 MB of traffic. The corresponding traffic density (shown in FIG. 24) has two plateaus, A and B. Plateau A of larger size has a lower density of traffic than plateau B. So, what is the best location for a small cell with radius of coverage=50 m?

Figure 25:
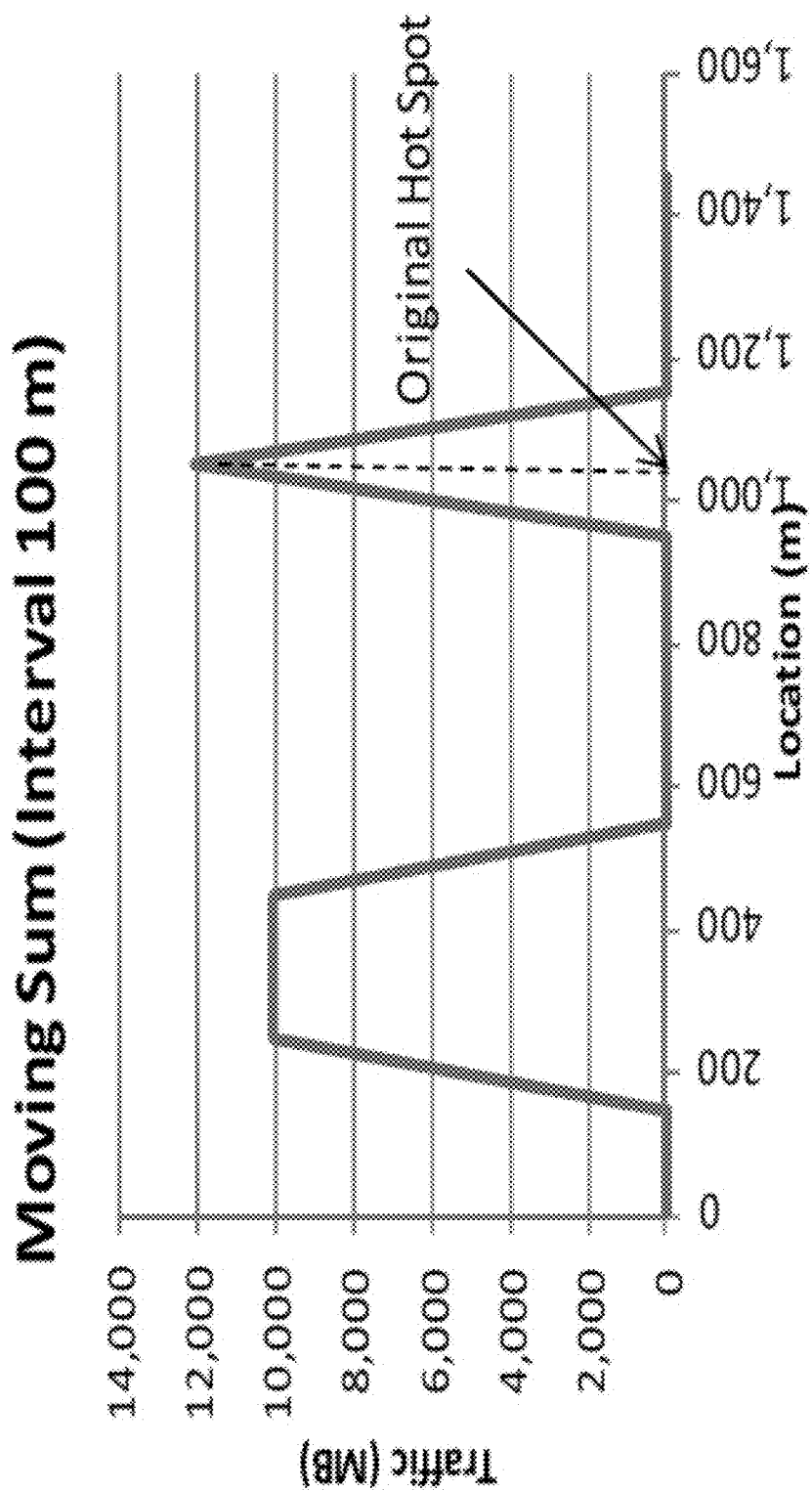
FIG. 25 shows a graph of a moving sum of the traffic density function of FIG. 24 with summation interval=100 m.
Figure 26:
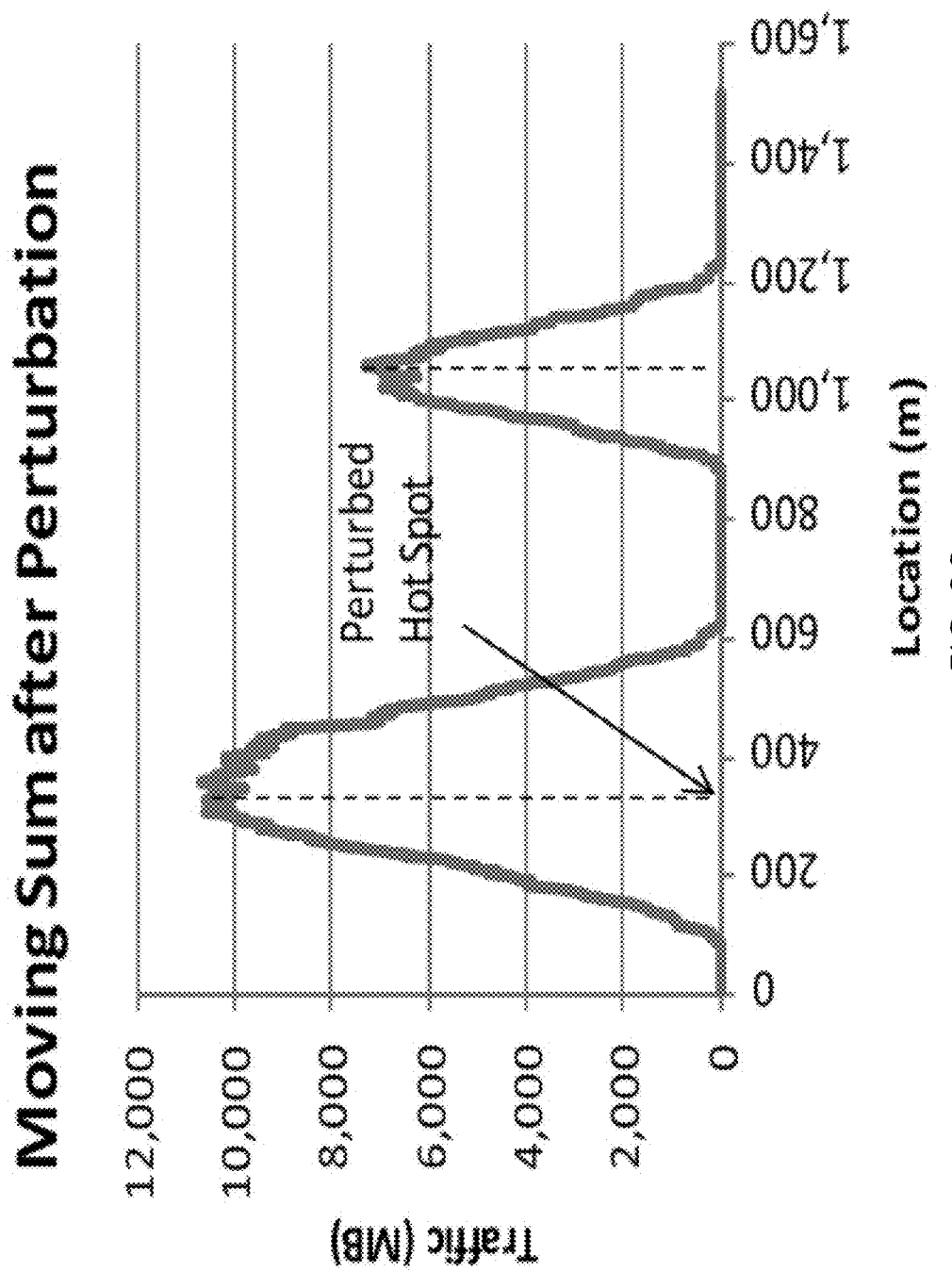
FIG. 26 shows a graph of a moving sum of the traffic density function of FIG. 24 after a perturbation factor E=80 m has been used.
Figure 27:
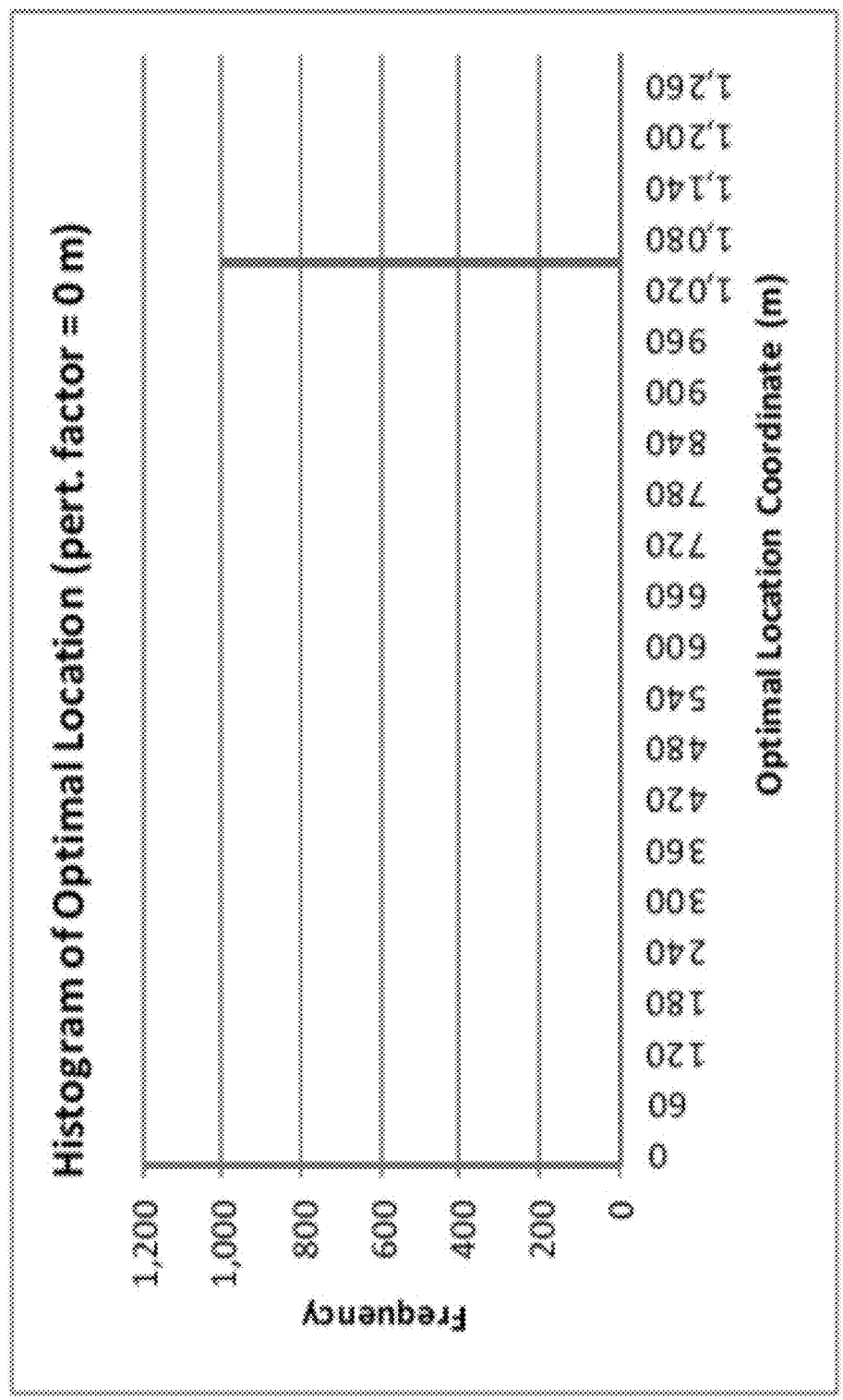
FIGS. 27-30 show histograms of optimal locations of perturbed hotspots for various perturbation factors.
Figure 28:
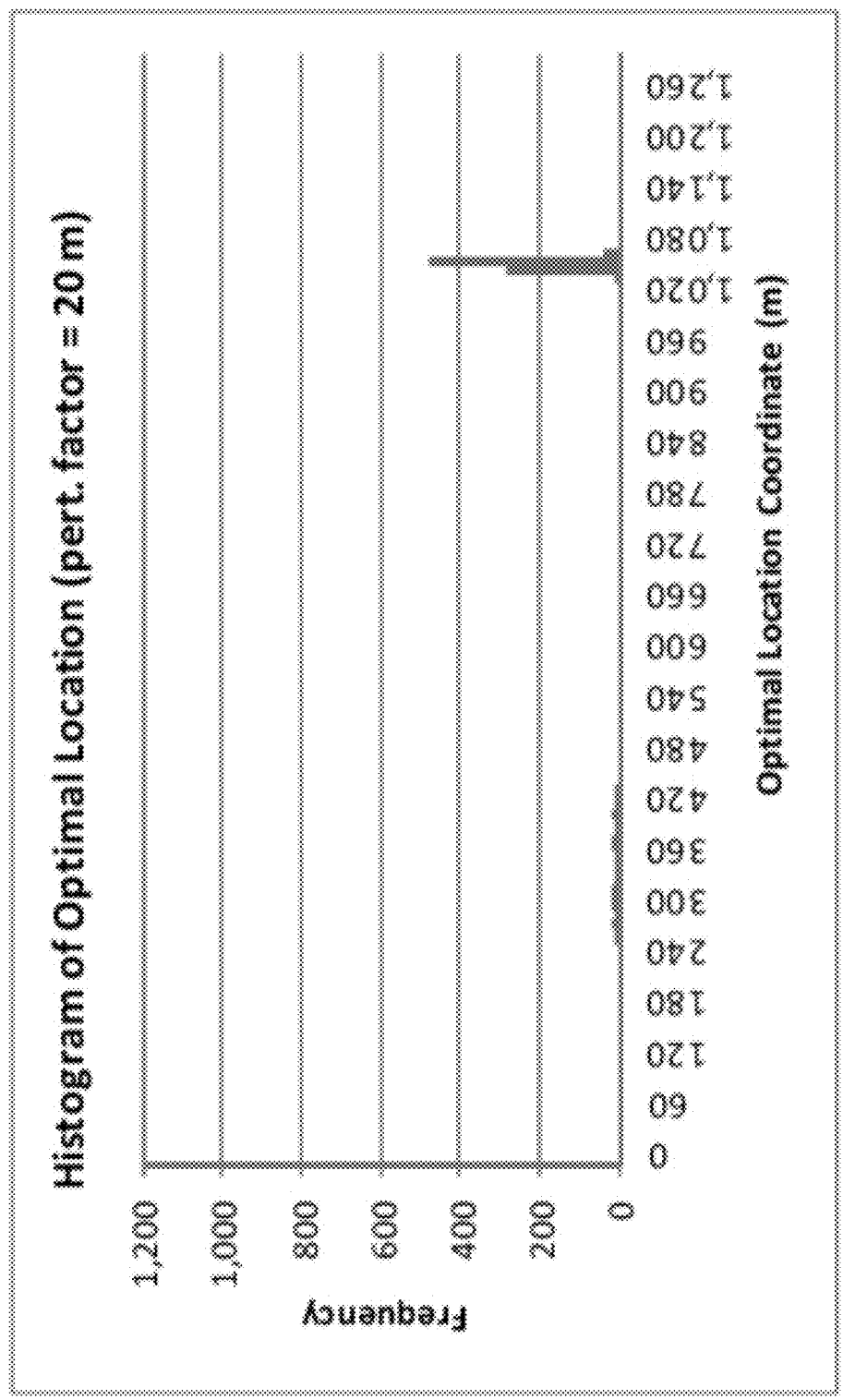
Figure 29:
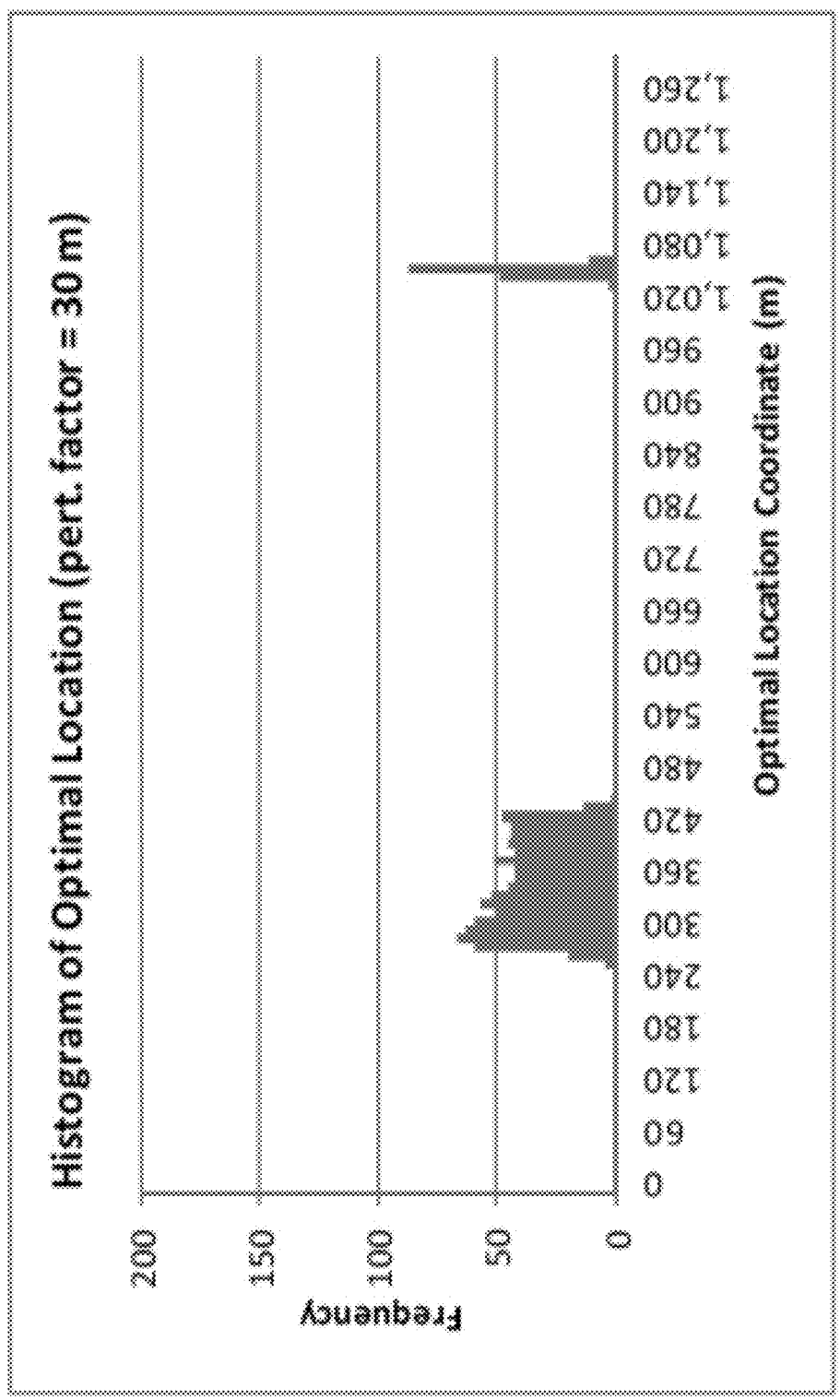
Figure 30:
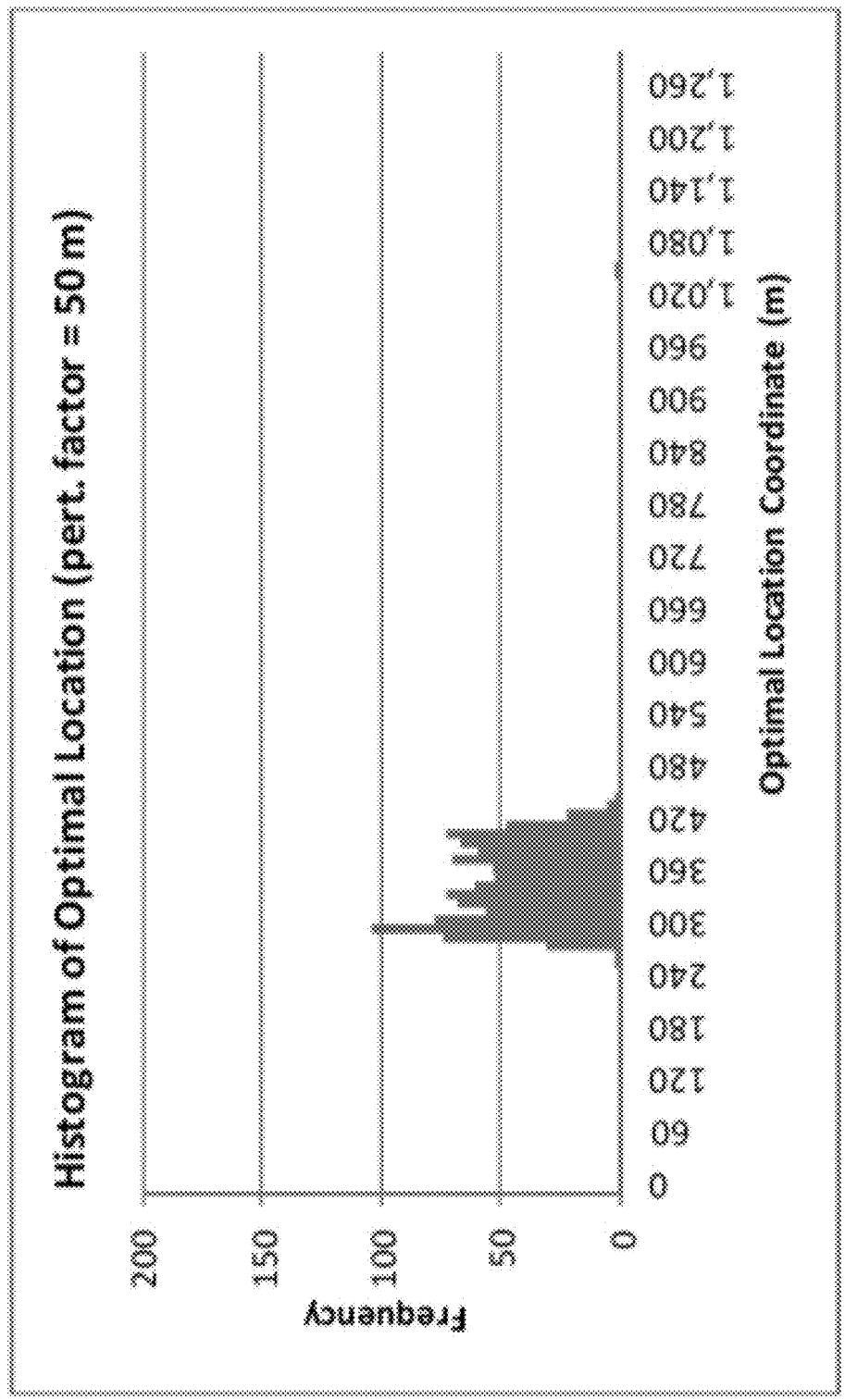

First, one must determine a maximum of a moving sum of traffic density function with summation interval=100 m. The best location for a small cell is at the center of plateau B, at the point=1,050 m, with ~12,000 MB offload traffic. That is a location of the original hotspot in the example as illustrated in FIG. 25. An alternative placement of the small cell at the center of plateau A allows offloading only 10,000 MB of traffic. Now, assuming that the original (observed) UE locations have been measured with some error (perturbation) randomly distributed on [−E, E], where E>0 is a perturbation factor. If the perturbation factor is big enough, it is better to place the small cell somewhere in the middle of [200, 500] segment, i.e., at 350 point, rather than at the point x=1,050 m. Indeed, each UE location has been moved from its original (observed) location x to a perturbed (true) location xp and the distance |x−xp| is a random number distributed uniformly on interval [0, E]. For the resulting traffic density, a moving sum for perturbed (true) UE locations can be plotted. On the chart of moving sum below (shown in FIG. 26), the perturbation factor E=80 m has been used. Note that after perturbation, the point where the moving sum obtained a maximum value (i.e., a location of perturbed hotspot) moved to a new position, at some point of plateau A. The distance between the original and perturbed hotspot can be significant, and depends on several factors, including distance between plateau A and B. Also note, that the amount of traffic offloaded by the small cell at the perturbed hotspot is ~10,000 MB; it is less than the traffic offload for the original (non-perturbed) data at the original hotspot (12,000 MB), but it is more than the amount of traffic that can be offloaded if the small cell is placed at the original hotspot position (~7,000 MB). The histograms of optimal locations of perturbed hotspots for various perturbation factors are presented in FIGS. 27-30 to illustrate the effect of the perturbation factor. For the original, unperturbed traffic density (perturbation factor=0), the optimal location is in the center of plateau B. When the perturbation factor increases, the optimal location shifts from plateau B to plateau A. Simulation with 1,000 iterations was used to plot the histograms of FIGS. 27-30.

This one-dimensional example of traffic distribution demonstrates that when the original hotspot is caused by a relatively small area of high traffic density (compared to perturbation factor), the location of the original hotspot is not stable under input data perturbation. In this example, before perturbation, 100 UE locations with 120 MB of traffic each were concentrated on a 100 m interval between 1,000 m and 1,100 m marks (plateau B), therefore 12,000 MB of traffic could be offloaded if a small cell with coverage radius=50 m was placed at the point 1,050 m (i.e., in the middle of plateau B). Each of the 100 UE locations between 1,000 m and 1,100 m were within 80 m from the boundary points of the interval [1000, 1100] and therefore had a chance of being outside of this interval after perturbation and to be dispersed over a larger area (between points 920 m and 1,180 m). Because of this "boundary effect" it would be impossible find a sufficient concentration of UE locations to offload 12,000 MB of traffic using one small cell with coverage radius=50 m. On the other hand, the UE locations before perturbation between points 200 m and 500 m (plateau A) with average traffic concentration of 10,000 MB per 100 m, are also dispersed after perturbation. However, because of the larger size of plateau A, the "boundary effect" does not affect the UE locations far enough from the boundary of the plateau A (i.e., within interval [280, 420]) and after perturbation it is still possible to find a 100 m interval within plateau A with UE locations that have 10,000 MB of total traffic offload.

Figure 31:
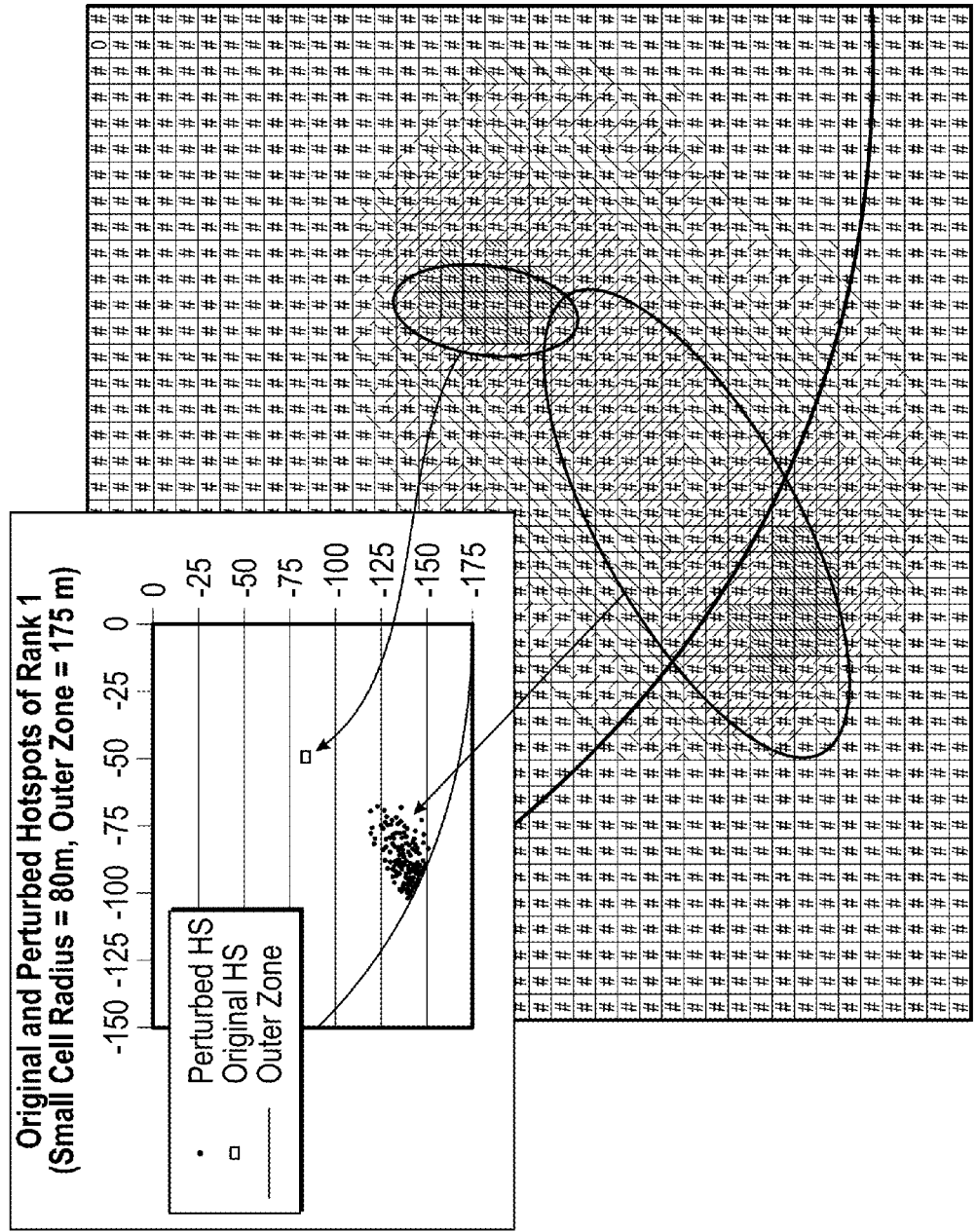
FIG. 31 shows a traffic offload map for a small cell coverage radius=80 m.

FIG. 31 shows a traffic offload map for small cell coverage radius=80 m based on the above-mentioned assumptions. For every 5 m×5 m bin the total offload traffic has been calculated for a small cell placed at the center of this bin. The map shown in FIG. 31 is shaded according to traffic offload intensity. Like in the one-dimensional example considered earlier, the location of the original hotspot is caused by high density traffic sources from a relatively small area, which is not stable under input data errors (perturbation). The location of hotspots from perturbed input data (perturbed hotspots) is caused by the relatively large area of traffic concentration inside and outside the southwest boundary of the outer zone; these hotspots form a relatively small cluster (cloud), which is stable under input data errors.

Figure 32:
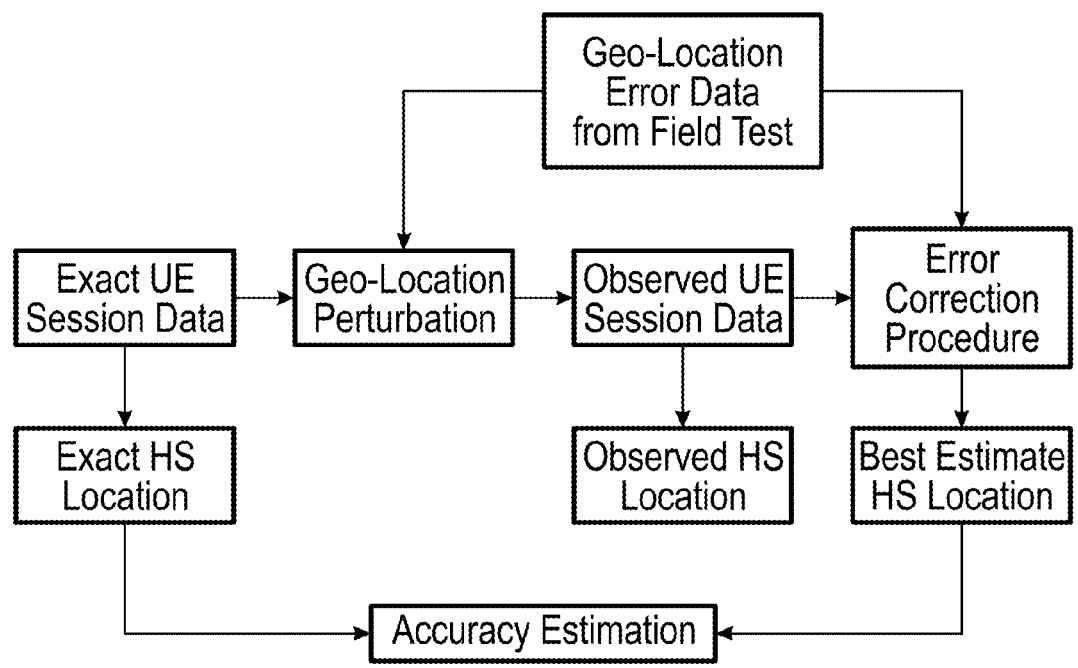
FIG. 32 shows an exemplary method for accuracy verification.
Figure 33:
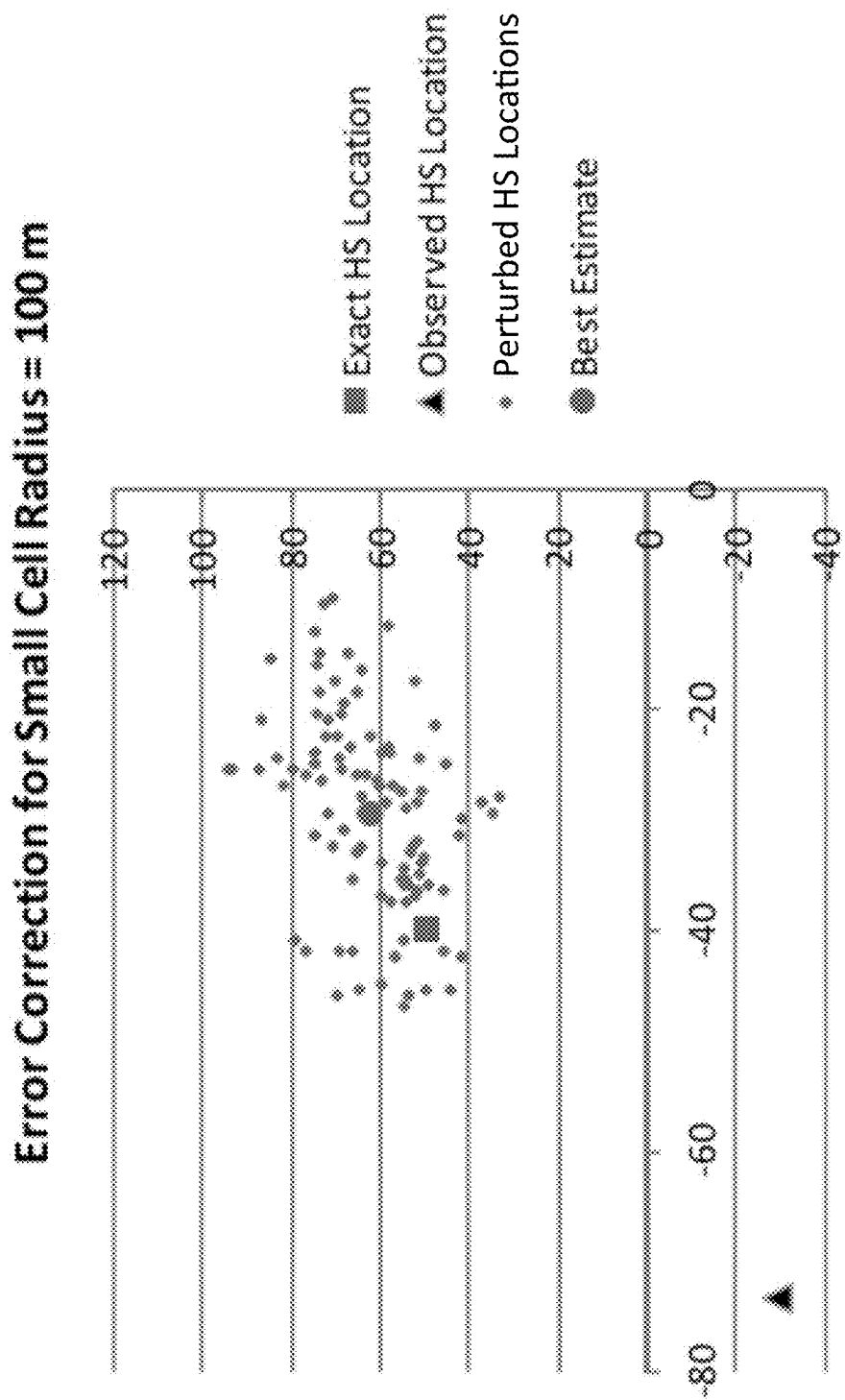
FIG. 33 shows the results of accuracy estimation for small cell radius=100 m.

The distance between the best estimate of the hotspot and the exact location of the hotspot can be used as a measure of accuracy of the proposed error correction methodology. In real-life situations, observed (estimated) UE locations are available, but exact UE locations are not available. For the purpose of accuracy verification, however, the methodology shown in FIG. 32 can be used. First, the exact UE location data can be assumed. Then, the observed UE location data can be generated by adding some random errors whose statistical characteristics are the same as the statistical characteristics of geo-location errors obtained during a field test. The observed UE session data (together with geo-location error data from the field test) is input into the traffic offload analyzer 14. The output of the error correction procedure is the best estimate of hotspot location. Also, exact and observed hotspot locations can be calculated based on exact and observed UE sessions. As a result, the distance between the exact hotspot location and the best estimate hotspot location can be calculated, i.e., accuracy of error correction. Results of accuracy estimation for small cell radius=100 m are presented in FIG. 33. The results of the simulations of FIGS. 12-20 demonstrate that the best estimate of hotspot location (i.e., result of error correction procedure) is within 2.6 m-10 m from the exact hotspot location (depending on small cell radius). Without error correction, corresponding distance between observed and exact hotspot locations is in the range of 39 m-68 m.

What is claimed is:

1. A computer-implemented method for macro cell hotspot identification, comprising:
   a processor reading an input data comprising a plurality of User Equipment (UE) session records in an area of interest, each of the plurality of UE session records including UE location information, wherein the UE location information comprises a first set of coordinates of a coordinate system;
   the processor generating a perturbed data comprising the plurality of UE session records with modified UE location information by adjusting the UE location information in each of the plurality of UE session records in the input data based on observed geo-location error data in the area of interest;
   wherein the observed geo-location error data comprises an error vector including a direction and a magnitude;

wherein the modified UE location information comprises a second set of coordinates of the coordinate system determined by translating the first set of coordinates by the error vector; and the processor identifying a hotspot with a high traffic concentration based on the perturbed data comprising the plurality of UE session records with modified UE location information.

2. The method according to claim 1, wherein the observed geo-location error data in the area of interest comprises a list of error vectors.

3. The method according to claim 2, further comprising the processor randomly selecting the error vector from the list of error vectors.

4. The method according to claim 3, wherein the processor generates the perturbed data by adjusting the UE location information in each of the plurality of UE session records in the input data with the randomly selected error vector.

5. The method according to claim 4, further comprising the processor newly randomly selecting an error vector from the list of error vectors and generating a new perturbed data by adjusting the UE location information in each of the plurality of UE session records in the input data with the newly randomly selected error vector.

6. The method according to claim 5, further comprising the processor identifying another hotspot with a high traffic concentration based on the new perturbed data comprising the plurality of UE session records with UE location information modified with the newly randomly selected error vector.

7. The method according to claim 6, wherein the steps of randomly selecting an error vector, generating a new perturbed data and identifying another hotspot with a high traffic concentration based on the new perturbed data are repeated a plurality of times.

8. The method according to claim 7, further comprising the processor analyzing a cluster of the identified plurality of hotspots with high traffic concentrations and identifying the centroid of the cluster.

9. The method according to claim 8, wherein each of the identified plurality of hotspots with high traffic concentrations is the best ranked hotspot for its corresponding perturbed data.

10. The method according to claim 1, wherein the processor identifies the hotspot with a high traffic concentration also based on amount of data transmitted to and from the UE locations and/or a size of a radius of a small cell.

11. A system for macro cell hotspot identification, comprising a processor configured to:

read an input data comprising a plurality of User Equipment (UE) session records in an area of interest, each of the plurality of UE session records including UE location information, wherein the UE location information comprises a first set of coordinates of a coordinate system;

generate a perturbed data comprising the plurality of UE session records with modified UE location information by adjusting the UE location information in each of the plurality of UE session records in the input data based on observed geo-location error data in the area of interest;

wherein the observed geo-location error data comprises an error vector including a direction and a magnitude;

wherein the modified UE location information comprises a second set of coordinates of the coordinate system determined by translating the first set of coordinates by the error vector; and identify a hotspot with a high traffic concentration based on the perturbed data comprising the plurality of UE session records with modified UE location information.

12. The system according to claim 11, wherein the observed geo-location error data in the area of interest comprises a list of error vectors stored in a storage device in communication with the processor.

13. The system according to claim 12, wherein the processor is further configured to randomly select the error vector from the list of error vectors.

14. The system according to claim 13, wherein the processor is configured to generate the perturbed data by adjusting the UE location information in each of the plurality of UE session records in the input data with the randomly selected error vector.

15. The system according to claim 14, wherein the processor is further configured to newly randomly select an error vector from the list of error vectors and generate a new perturbed data by adjusting the UE location information in each of the plurality of UE session records in the input data with the newly randomly selected error vector.

16. The system according to claim 15, wherein the processor is further configured to identify another hotspot with a high traffic concentration based on the new perturbed data comprising the plurality of UE session records with UE location information modified with the newly randomly selected error vector.

17. The system according to claim 16, wherein the processor is further configured to reiteratively randomly select an error vector, generate a new perturbed data and identify another hotspot with a high traffic concentration based on the new perturbed data for a plurality of times.

18. The system according to claim 17, wherein the processor is further configured to analyze a cluster of the identified plurality of hotspots with high traffic concentrations and identifying the centroid of the cluster.

19. The system according to claim 18, wherein each of the identified plurality of hotspots with high traffic concentrations is the best ranked hotspot for its corresponding perturbed data.

20. The system according to claim 11, wherein the processor is configured to identify the hotspot with a high traffic concentration also based on amount of data transmitted to and from the UE locations and/or a size of a radius of a small cell.

* * * * *